US012602504B2

(12) United States Patent
Cameron et al.

(10) Patent No.: US 12,602,504 B2
(45) Date of Patent: Apr. 14, 2026

(54) INTEGRATED AGENT-DRIVEN DATA FRAMEWORK

(71) Applicant: Citibank, N.A., New York, NY (US)

(72) Inventors: William Franklin Cameron, Jackson, FL (US); Prithvi Narayana Rao, Allen, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/340,698

(22) Filed: Sep. 25, 2025

(65) Prior Publication Data

US 2026/0023872 A1 Jan. 22, 2026

Related U.S. Application Data

(63) Continuation-in-part of application No. 18/900,216, filed on Sep. 27, 2024, now Pat. No. 12,475,235, which is a continuation-in-part of application No. 18/792,523, filed on Aug. 1, 2024, now Pat. No. 12,282,565, which is a continuation-in-part of application No. 18/607,141, filed on Mar. 15, 2024, which is a continuation-in-part of application No. 18/399,422, filed on Dec. 28, 2023, now Pat. No. 12,367,292, which is a continuation-in-part of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(51) Int. Cl.
*G06F 21/62* (2013.01)
*G06F 16/23* (2019.01)

(52) U.S. Cl.
CPC ...... *G06F 21/6218* (2013.01); *G06F 16/2358* (2019.01)

(58) Field of Classification Search
CPC ........................ G06F 21/6218; G06F 16/2358
See application file for complete search history.

(56) References Cited

U.S. PATENT DOCUMENTS

| 12,437,113 | B1 * | 10/2025 | Dahme | .................. | G06N 20/00 |
| 12,450,037 | B1 * | 10/2025 | Bhat | .......................... | G06F 8/30 |
| 12,483,411 | B1 * | 11/2025 | Chen | ........................ | H04L 51/02 |
| 2025/0094725 | A1 * | 3/2025 | Vishnoi | ................ | G06F 40/284 |
| 2025/0200046 | A1 * | 6/2025 | Schuler | .................. | G06F 40/40 |
| 2025/0291944 | A1 * | 9/2025 | Jagasia | ................. | G06F 21/604 |
| 2025/0306740 | A1 * | 10/2025 | Xie | ..................... | G06F 3/04817 |
| 2025/0307669 | A1 * | 10/2025 | Moyal | ................... | G06N 5/025 |

(Continued)

*Primary Examiner* — Stephen T Gundry
(74) *Attorney, Agent, or Firm* — Perkins Coie LLP; Sumedha Ahuja; Jason Francis

(57) ABSTRACT

The present disclosure relates to systems, methods, and devices for providing a centralized data store that receives and transmits data via agents that operate independently of one another. In some implementations, the agents transform data prior to transmission to the centralized data store. In some implementations, the centralized data store is configured to transform data. The centralized data store can evaluate, route, score, and otherwise manipulate and select received data. The centralized data store can respond to data requests based at least in part on its evaluation of received data.

24 Claims, 12 Drawing Sheets

(56) References Cited

U.S. PATENT DOCUMENTS

| | | | |
|---|---|---|---|
| 2025/0315470 A1* | 10/2025 | van de Nieuwegiessen ................ | G06F 16/45 |
| 2025/0321990 A1* | 10/2025 | Tu ......................... | G06F 16/383 |
| 2025/0322000 A1* | 10/2025 | Takamine ........... | G06F 16/3344 |
| 2025/0322077 A1* | 10/2025 | Panwar ............... | H04L 43/06 |
| 2025/0322244 A1* | 10/2025 | Mysore .............. | G06F 11/3684 |
| 2025/0330528 A1* | 10/2025 | Xie ......................... | H04L 67/52 |
| 2025/0335443 A1* | 10/2025 | Statton ................... | G06F 21/44 |
| 2025/0335458 A1* | 10/2025 | Lewis .................. | G06F 16/252 |
| 2025/0335487 A1* | 10/2025 | Jackson ............... | G06F 16/338 |
| 2025/0335509 A1* | 10/2025 | Nascimento ...... | G06F 16/90335 |
| 2025/0337701 A1* | 10/2025 | Du .......................... | H04L 51/02 |
| 2025/0348707 A1* | 11/2025 | Myers ................. | G06N 3/042 |
| 2025/0356026 A1* | 11/2025 | Myers ................. | G06F 21/577 |
| 2025/0358240 A1* | 11/2025 | Bhat .................... | H04L 47/822 |

* cited by examiner

| Data Source Nutrition Label | Source 1 | Source 2 | Source 3 |
|---|---|---|---|
| Applicability | ● | □ | ▲ |
| Reliability | ● | □ | ● |
| Completeness | □ | ● | ▲ |
| Freshness | ● | □ | □ |
| Overall | ● | □ | ▲ |

| Key | ● High | □ Medium | ▲ Low |
|---|---|---|---|

*FIG. 2A*

| Agent Nutrition Label | Agent 1 | Agent 2 | Agent 3 |
|---|---|---|---|
| Applicability | □ | □ | ▲ |
| Reliability | □ | ● | ● |
| Resiliency | ● | □ | ▲ |
| Cost | □ | ● | □ |
| Overall | □ | ● | ▲ |

| Key | ● High | □ Medium | ▲ Low |
|---|---|---|---|

| Input Components 704 | Network Connection Components 716 |

| Output Component(s) 706 | Persistent Storage(s) 718 |

| Processor(s) 708 | Computer-readable media drive(s) 720 |

Storage(s) 710

Application(s) 712

| Application 712a | Application 712b | ... | Application 712N |

Model(s) 714

| Model 714a | Model 714b | ... | Model 714N |

1000

Data Node
1004

Internal
Database(s)

Data Generation Platform
1002

Communication Engine
1012

Access Control Engine
1014

Breach Mitigation Engine
1016

Performance Engine
1018

Generative Model Engine
1020

Network
1050

Third-Party Database
1008a

Third-Party Database
1008n

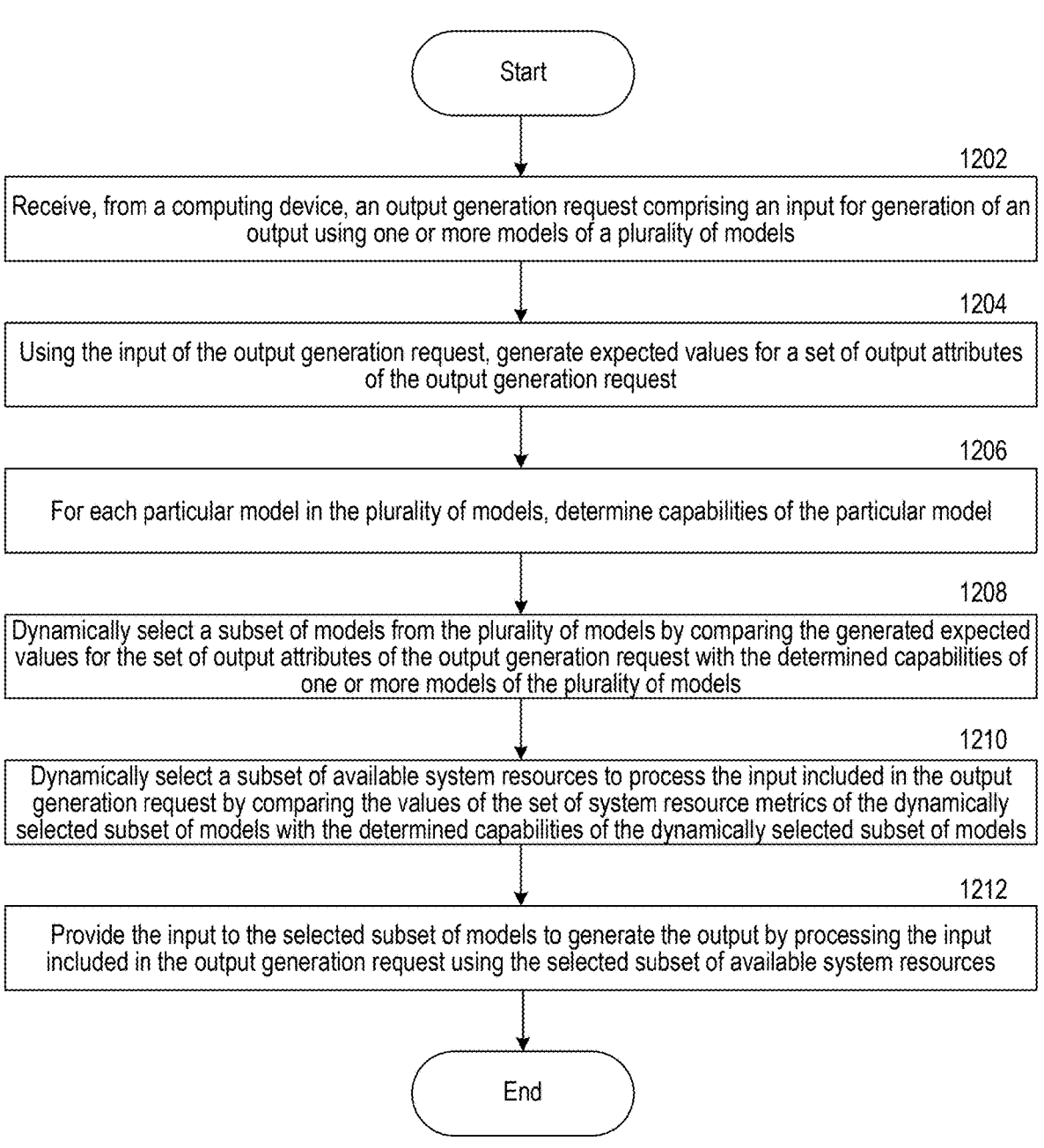

Start

1202

Receive, from a computing device, an output generation request comprising an input for generation of an output using one or more models of a plurality of models

1204

Using the input of the output generation request, generate expected values for a set of output attributes of the output generation request

1206

For each particular model in the plurality of models, determine capabilities of the particular model

1208

Dynamically select a subset of models from the plurality of models by comparing the generated expected values for the set of output attributes of the output generation request with the determined capabilities of one or more models of the plurality of models

1210

Dynamically select a subset of available system resources to process the input included in the output generation request by comparing the values of the set of system resource metrics of the dynamically selected subset of models with the determined capabilities of the dynamically selected subset of models

1212

Provide the input to the selected subset of models to generate the output by processing the input included in the output generation request using the selected subset of available system resources End

*FIG. 12*

INTEGRATED AGENT-DRIVEN DATA FRAMEWORK

CROSS-REFERENCE TO RELATED APPLICATIONS

This application is a continuation in part of U.S. patent application Ser. No. 18/900,216, filed Sep. 27, 2024, entitled "GENERATE CYBERSECURITY EXPLOIT DISCOVERY AND EVALUATION," which is a continuation-in-part of U.S. patent application Ser. No. 18/792,523, filed on Aug. 1, 2024, entitled "GENERATIVE CYBERSECURITY EXPLOIT SYNTHESIS AND MITIGATION", now U.S. Pat. No. 12,282,565, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422, filed Dec. 28, 2023, entitled "PROVIDING USER-INDUCED VARIABLE IDENTIFICATION OF END-TO-END COMPUTING SYSTEM SECURITY IMPACT INFORMATION SYSTEMS AND METHODS", which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023.

This application is further a continuation in part of U.S. patent application Ser. No. 18/951,120, filed Nov. 18, 2024, which is a continuation of U.S. patent application Ser. No. 18/633,293, filed Apr. 11, 2024, now U.S. Pat. No. 12,147,513.

This application is further a continuation in part of U.S. patent application Ser. No. 19/204,706, filed May 12, 2025, which is a continuation of U.S. patent application Ser. No. 18/830,573 entitled "LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME" and filed Sep. 11, 2024 (now U.S. Pat. No. 12,321,862), which is a continuation-in-part of U.S. patent application Ser. No. 18/821,880 entitled "SYSTEM-SENSITIVE MACHINE LEARNING MODEL SELECTION AND OUTPUT GENERATION AND SYSTEMS AND METHODS OF THE SAME" and filed Aug. 30, 2024, which is a continuation-in-part of and claims priority to U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024 (now U.S. Pat. No. 12,111,747 issued Oct. 8, 2024), which is a continuation-in-part of and claims priority to U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024 (now U.S. Pat. No. 12,106,205 issued Oct. 1, 2024), and is a continuation-in-part of and claims priority to U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024 (now U.S. Pat. No. 12,147,513 issued Nov. 19, 2024).

This application is a further continuation in part of U.S. application Ser. No. 18/812,913, filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

This application is further related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in its entirety.

FIELD

The present disclosure is directed to systems, methods, and devices for integrating data from a plurality of data sources into a centralized hub. Some implementations utilize loosely coupled or uncoupled agents to access, process, and/or store data.

BACKGROUND

Software systems have become increasingly complex and distributed, with many organizations relying on a diverse array of applications, services, and data sources to support their operations. Systems and information can be spread across multiple types of infrastructure, stored in various formats, and so forth. Some organizations may utilize multiple services, techniques, and so forth, such as operating some services or storing some data on premises while operating other services or storing other data using one or more cloud providers, which can include public cloud providers, private cloud providers, or both.

Data from a wide variety of sources can be useful for various tasks. However, many data sharing approaches result in tightly-coupled systems that are difficult to maintain and scale as new components or data sources are added, changed, and so forth, or in uncoupled systems that require extensive user knowledge to utilize effectively. Accordingly, there is a need for improved systems, methods, and devices for enabling data sharing in various scenarios.

BRIEF DESCRIPTION OF THE DRAWINGS

Detailed descriptions of implementations of the present invention will be described and explained through the use of the accompanying drawings.

FIGS. 2A and 2B illustrate example security labels according to some implementations.

FIG. 12 is a flow diagram illustrating a process 1200 for the dynamic selection of models and infrastructure to process the request with the selected models based on evaluation of user prompts, in accordance with some implementations of the present technology.

Figure 1:
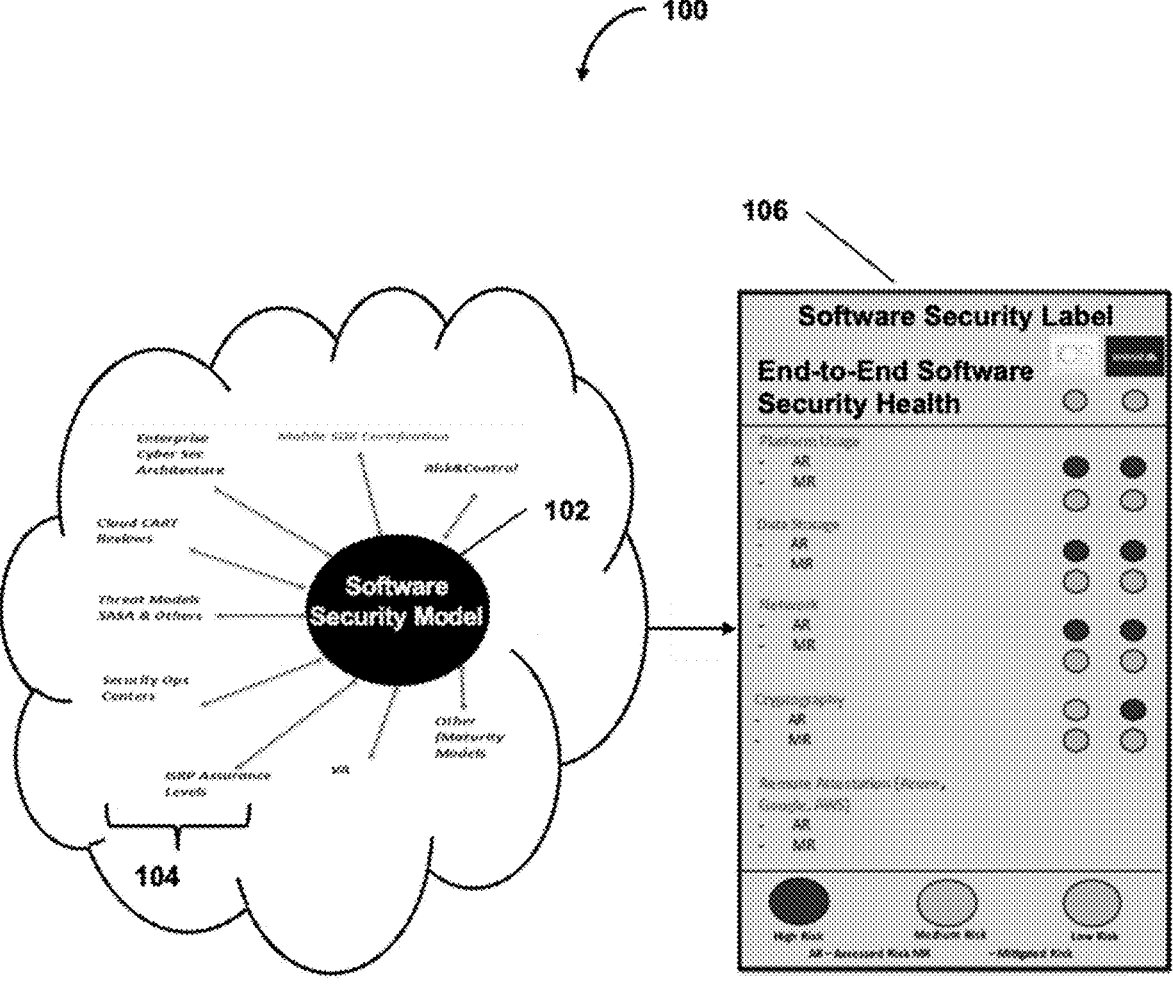
FIG. 1 is a block diagram showing an illustration of components used to determine platform-specific end-to-end security vulnerabilities and a graphical layout for displaying the platform-specific end-to-end security vulnerabilities via a Graphical User Interface (GUI)

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the technologies in the present disclosure can be practiced without many of these details. Likewise, one skilled in the relevant technology will understand that the technologies herein can include well-known structures or features that are not shown or described in detail, to avoid unnecessarily obscuring the descriptions of examples.

Security Assessment and Security Labels

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, etc.) does not include security vulnerabilities that may make the user's sensitive data prone to a data leak, man-in-the-middle attack, or other security vulnerabilities/attacks. However, as malicious entities continue to test these software applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time. Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

For example, due to the sheer amount of variations of software applications, the platforms software applications may be executed on, the hardware and software components that control or are otherwise associated with functions related to the software application, and security vulnerabilities that are known to exist amongst the hardware components, software components, and the platform, there is a large amount of time spent attempting to identify how respective computing aspects are impacted by these complex combinations which are also prone to errors as software developers use their mere opinion to determine which aspects are impacted. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

In various implementations, the methods and systems described herein can generate an improved graphical layout indicating computing-aspect-specific impact levels (e.g., as related to a software application and the platform the software application is being executed on) to indicate to an end-user whether the software application is safe to use. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability descriptions by using a platform-specific policy that indicates security impact information related to the security-vulnerability descriptions. Computing aspect impact levels for each computing aspect associated with the platform can be determined using the determined threat value for each security-vulnerability description. A graphical layout ("nutrition label") can then be displayed at a user interface, where the graphical layout comprises a graphical representation of each computing aspect impact level of each respective computing aspect of the set of computing aspects associated with the platform.

The above description focuses on security. However, the approaches herein can be readily applied to other contexts. For example, the approaches described herein can be used when selecting data, models, agents, and so forth for tasks such as managing inventory, evaluating loan applications, logistics planning, or any other task that utilizes significant amounts of data, possibly from different sources, or that can use different models or agents.

Graphical labels can be provided for platforms, software, data, models, and so forth, and can be directed to different aspects such as security, relevance, reliability, freshness, cost, and so forth. In general, a nutrition label can be used to help users make decisions about whether or not some aspect of computing meets certain requirements or goals in an easy, straightforward manner. In some implementations, data is processed using one or more machine learning models, agents, and/or the like. Different models or agents can be suited for different types of analysis. Moreover, different data sources may be more or less reliable than other data sources, or may be better suited to certain types of analysis. Accordingly, when evaluating application security, it can be important to select data that is better suited to the analysis being performed and to utilize models or agents better suited to the task at hand. In some implementations, data sources, models, agents, and so forth are selected based purely on the quality of the resulting outputs. However, data, models, agents, and so forth can be selected based on other criteria, such as cost, computing resource demand, and so forth. For example, a slightly less robust result may be preferable if it can be generated significantly more quickly or at a significantly lower cost than a more robust result.

Data and Model Selection

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

In addition to the challenges in selecting particular LLM models in order to solve a given problem, users or services of pre-existing software development systems faced significant challenges in understanding and managing the infrastructure needed to run these models. For example, users may not know what system resources are required to run the models (e.g., software, hardware, network resources), how to set up the models, how to test the models, or how to fine-tune the models effectively. Further, organizations often found themselves discarding legacy hardware that were unable to run newer models, which is undesirable from an Environmental, Social, and Governance (ESG) principle. For example, discarding legacy hardware not only leads to increased costs but also missed opportunities to reuse existing resources. Additionally, users tend to select the biggest, latest models under the presumption that the newest models were the best, without considering the cost implications and the potential for more efficient alternatives. Thus, conventional approaches often resulted in higher expenses and overlooked the benefits of using legacy hardware.

The platform disclosed herein enables dynamic evaluation of machine learning prompts for model selection, as well as validation of the resulting outputs, in order to improve the security, reliability, and modularity of data pipelines (e.g., software development systems). The platform can receive a prompt from a user (e.g., a human-readable request relating to software development, such as code generation) and determine whether the user is authenticated based on an associated authentication token (e.g., as provided concurrently with the prompt). Based on the selected model, the platform can determine a set of performance metrics (and/or corresponding values) associated with processing the requested prompt via the selected model. By doing so, the platform can evaluate the suitability of the selected model (e.g., LLM) for generating an output based on the received input or prompt. The platform can validate and/or modify the user's prompt according to a prompt validation model. Based on the results of the prompt validation model, the platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models for processing user prompts in a resource-sensitive manner. The system state can include a current CPU usage associated with processors of the platform. Based on the system state, the platform can calculate a threshold metric value that indicates an allotment of system resources available for generating an output based on the prompt. The platform can determine the estimated performance metric value associated with generating the output using the user's selected machine learning model (e.g., LLM). In response to determining that the estimated performance metric value satisfies the threshold metric value, the platform can provide the prompt to the selected model (e.g., LLM) for generation of the requested output and subsequent transmission to a system that enables the user to view the output. When the estimated performance metric value does not satisfy the threshold metric value, the platform can determine another model (e.g., a second LLM) for generation of the output.

As such, the disclosed platform enables flexible, secure, and modular control over the use of LLMs to generate outputs. By evaluating the system effects associated with processing an input (e.g., a natural language prompt) using an LLM to generate an output, the platform can mitigate adverse effects associated with system overuse (e.g., CPU overclocking or cost overruns). Furthermore, by redirecting the prompt to an appropriate model (e.g., such that the predicted system resource use is within expected or allowed bounds), the platform enables the generation of outputs in a resilient, flexible manner, such that inputs are dynamically evaluated in light of changing system conditions (e.g., changing values of CPU usage, bandwidth, or incurred cost).

The inventors have also developed a system for evaluating model outputs in an isolated environment to mitigate errors and security breaches. For example, the platform determines whether an output from a machine learning model, such as an LLM, includes particular types of data (e.g., including software-related information, such as a code sample, code snippet, or an executable program). In such cases, the platform can provide the generated output to a parameter generation model (e.g., an LLM) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code.

The parameter generation model can generate a virtual machine configuration for testing the behavior of the executable instructions. For example, the platform determines an indication of a simulated hardware configuration for a virtual environment in which to test and host the compiled instructions, including a processor architecture and/or memory/storage limits associated with the virtual environment. In some implementations, the platform determines a software configuration for the virtual environment, including an operating system and/or associated environment variables (e.g., directory structures and/or relevant filepaths). The platform can generate the virtual environment (e.g., within a virtual machine) according to the virtual machine configuration to enable compilation of the generated code within an isolated environment (e.g., a "sandcastle") for testing the code.

The disclosed platform enables the flexible evaluation of output in an application-specific manner. To illustrate, the platform can configure a validation test for evaluating code generated from an LLM based on information within the prompt provided to the LLM and the nature of the output of the LLM. Furthermore, the platform can configure the test environment (e.g., a virtual machine environment) depending on the applicability of the generated code or nature of the input and/or user. By monitoring test outputs from compiled code generated by a machine learning model (e.g., an LLM), the platform enables mitigation of errors, software bugs, or other unintended system effects.

The inventors have further developed a system for dynamically selecting, in response to an input, one or more AI models to generate an output and the infrastructure to run the one or more AI models. For example, the system receives an output generation request including an input for the generation of an output using one or more models from a plurality of models. The system can generate expected values for a set of output attributes (e.g., a type of the output generated from the input, a threshold response time of the generation of the output) of the output generation request. For each particular model in the plurality of models, the system can determine the capabilities of the particular model (e.g., estimated performance metric values for processing requests, system resource metric values indicating an estimated resource usage), and dynamically select a subset of models from the plurality of models. For the selected subset of models, the system can dynamically select a subset of available system resources to process the input included in the output generation request. The system generates the output by processing the input included in the output generation request using the selected subset of available system resources.

The disclosed platform reduces the risk of selecting inefficient or insecure generative machine learning models and increases the efficiency of running the selected models. For example, the platform allows for the reuse of legacy hardware by reducing the need to discard older equipment and allowing organizations to manage costs of running the models more effectively. Additionally, the platform simplifies the management of infrastructure needed to run the selected models, reducing the need for users to understand the intricacies of system resource requirements and model specifications. By dynamically selecting the models and infrastructure in response to an incoming user inquiry (e.g., a prompt), the disclosed platform can tailor the constraints used in selecting the models or infrastructure to a specific use case. The flexibility allows the disclosed platform to adapt to various use cases with differing criteria, such as performance, cost, security, and environmental considerations. For example, in a high-security environment, the platform can prioritize models and infrastructure that offer more security features and thorough output validation. In cost-sensitive scenarios, the platform can select models and hardware configurations that more efficiently use resources and lower expenses. Additionally, the platform can reuse legacy hardware to align with ESG principles by reducing waste and promoting sustainability.

The methods disclosed herein cause a reduction in greenhouse gas emissions compared to traditional methods for operating models. Every year, approximately 40 billion tons of $CO_2$ are emitted around the world. Power consumption by digital technologies account for approximately 4% of this figure. Further, conventional user device and application settings can sometimes exacerbate the causes of climate change. For example, the average U.S. power plant expends approximately 500 grams of carbon dioxide for every kWh generated. The implementations disclosed herein for conserving hardware, software, and network resources can mitigate climate change by reducing and/or preventing additional greenhouse gas emissions into the atmosphere. For example, reducing the system resources used to run selected models and reusing legacy hardware (as opposed to discarding the hardware) as described herein reduces electrical power consumption compared to traditional methods. In particular, by adjusting the models and infrastructure selected based on particular output attributes of an incoming output generation request, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO_2$. Each GB of data downloaded thus results in approximately 3 kg of $CO_2$ emissions or other greenhouse gas emissions. The storage of 100 GB of data in the cloud every year produces approximately 0.2 tons of $CO_2$ or other greenhouse gas emissions. Adjusting the models and infrastructure selected according to the implementations disclosed herein reduces the amount of data downloaded, and obviates the need for wasteful $CO_2$ emissions. Therefore, the disclosed implementations for reconfiguring the amount of resources used by output generation requests mitigates climate change and the effects of climate change by reducing the amount of data stored and downloaded in comparison to conventional network technologies.

Attempting to create a system to dynamically select the most appropriate AI models and system resources based on varying output generation requests and system states in view of the available conventional approaches created significant technological uncertainty. Creating such platform required addressing several unknowns in conventional approaches in processing output generation requests, such as how to accurately predict the performance and resource requirements of different AI models under varying demands in output generation requests before processing the output generation requests. Similarly, conventional approaches in processing output generation requests did not provide methods of adapting the selection of the corresponding infrastructure (e.g., system resources) of selected AI model(s) to real-time changes in system resource availability and user demands between output generation requests.

Conventional approaches rely on static allocation of resources and predefined model selection criteria, which do not account for real-time variations in system state or user demands. For example, a conventional system may allocate a fixed amount of CPU and memory to each AI model based on historical usage patterns, and fail to consider the current load or the specific requirements of the incoming requests. In response to variations in system state or user demands, conventional approaches typically involve manual configurations, which can not only be time-consuming but also challenging for users unfamiliar with model performance metrics, much less managing the infrastructure needed to run the models. Conversely, the disclosed system determines how to dynamically allocate resources like CPU, GPU, and memory to different selected AI models based on the particular model(s)' specific needs and/or current available system resources, all of which is subject to variation between output generation requests.

Additionally, integrating legacy hardware into the system created further technological uncertainty, since the legacy hardware must be integrated efficiently without compromising the performance of newer, more demanding AI models. Legacy hardware often has limited computational power and memory compared to modern systems, which can create bottlenecks when running resource-intensive AI models. To successfully integrate legacy hardware into the system, all potential factors of efficiency and compatibility (e.g., computational complexity of each model, software frameworks used by each model, the data throughput requirements, latency constraints, compatibility issues between the legacy hardware and the newer software frameworks) must be taken into consideration.

To overcome the technological uncertainties, the inventors systematically evaluated multiple design alternatives. For example, the inventors tested different AI models of varying capabilities for text generation, image recognition, and summarization tasks. The inventors measured values of metrics such as the response time, accuracy, and/or resource usage of each model under various conditions, such as different input sizes and types, varying system loads, and different hardware configurations. The data was used to create performance profiles for each model, which allowed the inventors to use the performance profiles to predict a particular model's behavior under different conditions.

The use of static resource allocation, where fixed amounts of CPU, GPU, and memory were pre-assigned to each AI model, proved to be inefficient as static allocation failed to adapt to real-time variations in system load and user demands, leading to resource underutilization and bottlenecks. Similarly, implementing a first-come-first-served (FCFS) scheduling algorithm did not account for the varying computational complexities and priorities of different tasks which increases latency for the output generation requests. Further, only the latest hardware, which, while simpler, led to higher operational costs and electronic waste and ignored the potential benefits of integrating legacy hardware for environmental sustainability.

Thus, the inventors experimented with different methods for dynamically allocating system resources. For example, the inventors tested various algorithms for load balancing (e.g., round-robin, least connections, weighted least connections), resource scheduling (e.g., first-come-first-served, priority-based scheduling, fair scheduling), and model selection to identify the most efficient and effective approaches. Additionally, the inventors systematically evaluated different strategies for integrating legacy hardware into the system. The inventors evaluated, for example, different methods of partitioning a single workload between new and legacy hardware (e.g., a "hybrid" approach), such as offloading less demanding tasks to older systems while reserving newer hardware for more demanding tasks.

While the current description provides examples related to Large Language Models (LLMs), one of skill in the art would understand that the disclosed techniques can apply to other forms of machine learning or algorithms, including unsupervised, semi-supervised, supervised, and reinforcement learning techniques. For example, a platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

While the above discussion relates primarily to LLMs and generative models, it will be appreciated that the described techniques can be readily applied to a wide variety of contexts and to different types of models which can be configured to generate content, analyze data, etc. Moreover, the techniques herein can be applied to agents that act autonomously or semi-autonomously and which can include one or more trained models. An agent can function to implement a set of actions. Moreover, the approaches described herein can be applied to data sources additionally or alternatively, for example to select an optimal data source from among a plurality of data sources.

Data Integration Platform

There are significant difficulties associated with sharing information in modern computing environments. Centralized integration platforms have emerged as a potential solution to manage the complexity of distributed systems. These platforms can provide a unified interface for connecting different applications and services, facilitating data exchange, and coordinating workflows across an organization's IT ecosystem. However, such solutions may struggle to handle the volume and variety of data and interactions in large-scale environments. Moreover, such solutions may be tailored to specific kinds of use cases (e.g., malware detection, application processing) or specific data sources, but it can be difficult to adapt such solutions to different use cases or different data sources.

Modular and extensible architectures can offer advantages in terms of flexibility and scalability. By enabling components to be added, removed, or modified without disrupting the entire system, modular approaches can adapt more readily to changing business requirements, changing technological landscapes, and changing problem statements. In contrast, tightly coupled systems are typically designed to solve particular problems and struggle to adapt to changing environments and use cases. However, designing flexible solutions presents many challenges.

Described herein are approaches and architectural designs that utilize a "hub and spoke" approach for data collection, sharing, processing, and so forth. A central hub acts as a source for information and can provide other functionality such as managing access permissions, enforcing business logic, intelligently selecting information and managing workflows, remediating issues, and so forth. Agents can communicate with the hub to share information, retrieve information, and so forth. While described as a hub or central hub, it will be appreciated that the hub is not necessarily a single system, and in practice can be implemented in a variety of ways to achieve scalability and flexibility.

As used herein, an agent can refer to a program or collection of programs that receives one or more inputs and takes one or more actions autonomously or semi-autonomously, for example with limited human guidance, such as via a configuration setting. Some agents implement an artificial intelligence (AI) model that is trained to implement a set of one or more actions.

In general, an agent can be an entity that perceives its environment and takes action to achieve a specific goal. As an example, a financial trading agent configured to maximize profit can utilize one or more sensors to perceive its environment (e.g., analyzing real-time trading data such as price movements and trading volumes). Based on this analysis, the financial trading agent can use a machine learning/ artificial intelligence model to determine the best course of action, such as buying or selling a stock, to maximize profit. Agents can follow a standard loop of perception (e.g., ingesting new data), decision-making, and action, and can do so either without supervision or with input from a human. For example, the financial trading agent may recommend trades but not execute them unless approved by a human, or an agent for medical treatment may recommend a dosage adjustment, but a doctor may ultimately make the decision of whether or not to adjust a patient's dosage.

The approaches described herein can be utilized in a wide variety of scenarios where it is beneficial to use information from a variety of disparate sources. For example, the approaches described herein can be used in healthcare to facilitate accessing patient data across different systems, in manufacturing to access data from different assembly line equipment, metrology equipment, etc., in agriculture to access data for monitoring weather, soil moisture, automated equipment, etc., in finance to facilitate using data from multiple sources such as multiple credit reporting agencies, and so forth. A significant use of the techniques described herein can be in cybersecurity, where utilizing data from a wide variety of sources such as networking equipment, servers, laptops, desktops, and so forth, can be important for uncovering attacks and vulnerabilities that might otherwise go undetected.

As an example, the approaches herein can be used in a computer security context. For example, in the context of network security, agents can supply the hub with data from security appliances such as firewalls, intrusion detection systems, and network monitoring tools. The hub can aggregate and correlate data from diverse sources, providing a holistic view of the network's security posture, or the hub may simply make such data available for other systems to use. In some implementations, agents can interact with the hub to share threat intelligence and coordinate responses. For example, an agent monitoring network traffic patterns may detect anomalous behavior indicative of a potential distributed denial of service (DDOS) attack. This information can be shared via the hub, trigger automatic reconfiguration of firewall rules, blocking certain IP address, and so forth, in order to mitigate the threat.

In some implementations, a loosely coupled (or even decoupled) hub and spoke model is used. A central hub can act as a shared repository for storing data, event information, context information, and so forth. The central hub can facilitate central control, data isolation, version control of business logic, access policies, and so forth. This can be advantageous over other approaches as the central hub provides a single source to be controlled, rather than using a variety of sources that each have their own access controls, logging, and so forth.

As described herein, a modular, loosely coupled or even decoupled design can offer significant advantages over designs that are more rigid or static. Multiple agents and other components can interact with the central hub, for example to add information, retrieve information, and so forth. Agents and other components can operate independently of one another and communicate or share information with one another exclusively through the hub, without necessarily involving any agent-to-agent communication. Agents can be added or removed without affecting the overall system as there is no agent-agent dependence, nor does the central hub depend upon the existence of any particular agent. For example, if an agent stops communicating with the hub, the hub may simply no longer have data that the agent used to provide. In some implementations, the hub flags certain data as stale when updates from an agent have not been received for more than a threshold period of time, which can vary from agent to agent, based on the type of data provided by the agent, and so forth. In some implementations, data may still be available from the hub even if it has not been updated. In some implementations, the hub is configured to not provide data that is considered stale, in order to avoid providing out-of-data information to a requesting agent.

In some implementations, each agent is associated with a trust level. The trust level can be based on, for example, how long the agent has been registered, how frequently the agent provides data updates, known security measures or verification measures taken by the agent (e.g., remote attestation), the size of updates, and so forth. In some implementations, changes in agent behavior can impact the trust level. For example, the hub may decrease an agent's trust level if the agent starts sending much larger or smaller updates than normal, which may indicate that the agent has been compromised or is otherwise malfunctioning.

In some implementations, agents can access or share information asynchronously. That is, for example, an agent can send data to the central hub without regard to when another agent might access that data, and agents can request data from the central hub without any time-dependence on other agents. In some implementations, blocking or other techniques are used to prevent conflicts between agents. For example, writing an update to a dataset may be delayed if another agent is already reading from the dataset, or reading can be paused while an agent updates a dataset. In some cases, blocking is not used.

Such a loosely-coupled system can help with responsiveness, fault tolerance, and so forth as compared to some other centralized data repository approaches. For example, the central hub can continue operating normally even if an agent fails.

In some embodiments, the hub and spoke model described herein utilizes publish-subscribe communication mechanisms, and agents can selectively receive or access updates. In some implementations, agents pull data from the hub. In other implementations, the central hub pushes data to one or more agents. Pushing can occur using a best-efforts approach with no guarantee of delivery or limits on attempts to re-delivery so that the centralized hub is not overly impacted when an agent is unavailable. In some implementations, a combination of push and pull is used. For example, an agent may receive updates on a regular schedule, but there may be deviations from the schedule for manual pulls or for pushing information to the agent, such as for information tagged by another agent or by the hub as urgent or critical.

In some implementations, the central hub optimizes resource utilization by only transmitting data when it is requested by an agent or other component with access to the central hub.

It will be appreciated that the hub is not necessarily merely a large repository for mixed data. Rather, the hub can include various functions such as managing data isolation, version control of certain business logic, access policy management, and so forth, as described herein in more detail.

In some implementations, changes to rules or business logic are maintained centrally. For example, the hub can be configured with rules or business logic for particular processes, and can respond to agent requests in accordance with the rules. For example, rules may restrict how old data can be when being used for certain activities. As another example, multiple agents may provide similar or even the same information, but only data provided by a specific agent or from a specific source may be permitted for use in certain scenarios.

In some implementations, the hub is configured to resolve conflicts when accepting data. For example, two different agents may try to upload to same information to the hub. The hub can be configured to prefer one agent over the other and to only accept data from the preferred agent. The non-preferred agent can act as a fallback agent, and data can be accepted from the non-preferred agent in certain circumstances, such as when the preferred agent has not submitted data to the hub within a threshold period of time.

Agents within a distributed system can be designed with a standardized definition, such that they behave in particular ways that are expected by the hub. For example, agents can generally follow a standard lifecycle. Such a lifecycle can include, for example, initialization, where the agent sets up its environment and registers with the central hub; message handling, where the agent processes incoming communications; data processing, where it performs its core functions; and termination, where it gracefully shuts down and cleans up resources. This structured approach helps ensure that agents are predictable, manageable, and easier to monitor or troubleshoot. Depending on the system's needs, agents may be stateless—handling each request independently without retaining information between interactions—or stateful, maintaining context and session data to support more complex workflows or long-running processes.

In some implementations, a hub may be indifferent to the detailed functionality of any given agent, and different agents may operate differently. For example, the hub can support a number of standardized functions, interfaces, and the like, and any agent that complies with authentication requirements and communicates utilizing the standardized functions and interfaces can communicate with the hub.

To help maintain data integrity across the system, atomic transactions can be used. This approach ensures that a series of operations either all succeed or all fail, preventing partial updates that could lead to inconsistencies. This can be significant as partial failures can have significant impacts on data integrity and possibly on other processes. For example, in a money transfer, if a debit transaction succeeds and the corresponding credit transaction fails, this creates a scenario where money was removed from one account but not deposited into the other account. As another example, a customer can select a seat for a flight during booking. If the seat is marked as booked but the customer's payment fails, the seat is in fact available but other customers cannot book it. On the other hand, if the payment succeeds but the seat reservation fails, this can lead to a double booking for the same seat.

Agents, the central hub, or both can implement ETL (Extract, Transform, Load) pipelines. These pipelines are responsible for moving data between systems, transforming it as needed, and loading it into target destinations. ETL processes can be important so that data that is populated in the hub adheres to expected formatting, which can reduce potential errors and make further processing more straightforward.

In some implementations, ETL processing can be relatively straightforward, such as converting dates from one format to another (e.g., from MM/DD/YYYY to YYYY-MM-DD), or converting a measurement from imperial to metric units. Other scenarios can be more involved. For example, an agent that carries out web scraping for data collection can be configured to process accessed files, such as HTML files, and extract data based on tags in the files, patterns in the files, etc.

In some implementations, the hub includes transformation functionality. This can be desirable as it can help ensure consistency in the data that is stored by the hub. For example, if two agents each access HTML files for data to be added to the hub, they may produce different outputs even for the same HTML file if each agent uses its own parsing algorithm. If the hub receives the HTML data and parses it, the outputs can be more reliable as all HTML data can be parsed using the same centrally-implemented algorithm.

A variety of communication protocols can be supported, including MQTT and AMQP for lightweight messaging, REST and GraphQL for web-based APIs, and gRPC or SOAP for more structured or legacy integrations. This flexibility allows the system to interact with a wide range of external services and data sources. In some implementations, the hub includes one or more compatibility layers that enable communication using a variety of methods. While such compatibility layers can be beneficial, for example when working with legacy systems, it can generally be desirable to require agents to communicate using a single, well-defined set of functions and interfaces. Accordingly, some implementations do not include such compatibility layers, or compatibility layers may be enabled only for specific systems, agents, etc.

Security and access control are critical in any distributed system. Identity and access management (IAM) can be implemented using standards such as OAuth for delegated authorization, JSON Web Tokens (JWT) for stateless authentication, role-based (RBAC) and/or attribute-based (ABAC) access control models, and so forth. These mechanisms help ensure that only authorized agents and users can access sensitive resources or perform privileged actions.

In some cases, there may be a large amount of data flowing into the hub, out of the hub, or both. Accordingly, a significant challenge of the hub and spoke model is ensure the requests are processed in an orderly, efficient, and robust manner. In some implementations, the hub includes a message queue system that is used to facilitate communication between agents and the hub. Such a system can support point-to-point messaging, where messages are delivered to a specific recipient, publish-subscribe patterns, where messages are broadcast to multiple subscribers, or both. Some implementations include dead letter queues for handling undeliverable messages, message capabilities for tracking delivery status, and idempotent receivers to prevent duplicate processing.

In some implementations, a dead letter queue acts as a holding area for messages that cannot be processed by their intended consumer (e.g., by the hub in the case of data being transferred to the hub). Messages can end up in the dead letter queue due to processing failures such as invalid data or database connection issues, message expiration (e.g., the message was not processed before exceeding a time-to-live), queue overload (e.g., the hub is not capable of accepting additional data for processing), malformed messages (e.g., the content is corrupted or doesn't conform to require formats), and so forth. A dead letter queue can enable troubleshooting and improve system reliability, and can also aid in the identification of malicious activity, for example when a malicious actor either intentionally or accidentally sends malformed messages.

In some implementations, a hub and spoke platform is configured in an idempotent manner, such that retries do not undesirably result in duplicate data being written to the hub.

For example, messages can include unique identifiers, and the hub can be configured to check if a unique identifier has already been processed prior to processing a new message. In some implementations, the hub utilizes database constraints that require one or more fields to be unique.

Message prioritization can be configured, allowing the system to handle critical communications with higher quality of service (QOS) levels, ensuring that urgent tasks are addressed promptly. For example, the hub can be configured to assigned a higher priority to certain agents, such as agents that provide more time-sensitive data or that provide more mission-critical information.

Wildcard subscriptions can be supported, enabling agents to subscribe to broad categories of messages rather than individual topics. This is similar to the use of nested tags in some organizational systems, allowing for flexible and dynamic message routing and providing flexibility in the specificity required for agents to receive information.

The centralized nature of the hub simplifies system-wide updates and modifications. Administrators can implement changes at the hub, which are then distributed throughout the network. Versioned configuration management and feature flags can be used to control the rollout of new features or settings, enabling gradual adoption and easy rollback if issues arise. An audit logging system can track all changes, providing a detailed record of who made what changes and when. This supports accountability and enables rollback capabilities, allowing the system to revert to a previous state if necessary.

To ensure that configuration changes reach all agents, a "gossip" protocol can be used. This decentralized approach allows updates to propagate organically through the network, eventually reaching every agent even in the face of intermittent connectivity. In some implementations, the hub communicates directly with each agent to notify the agents of configuration changes.

The process for agent registration is another important consideration. Agents may use mechanisms such as mDNS for local discovery or register with a centralized agent registry operated as part of the hub. The hub can utilize specific criteria for determining which agents are allowed to participate and what contributions they can make, helping to maintain order and security. This prevents the system from becoming chaotic or vulnerable to unauthorized agents.

Remote attestation can be used to verify that an agent is permitted access to the hub. In remote attestation, the agent produces certain information that enables the hub to decide whether the agent is trusted. An attestation process can include an agent generating an indicator of its current state (e.g., version, configuration, etc.). The indicator can be signed by a hardware root of trust, such as trusted platform module (TPM) or feature within a CPU such as Intel SGX or AMD SEV. The signed indicator and a certificate from the hardware manufacturer can prove legitimacy. Remote attestation can be significant as agents may be used to supply information to the hub that is highly sensitive or critical to other processes that rely on the information in the hub being accurate.

Authentication methods can include traditional username and password combinations, API keys for programmatic access, client certificates for mutual TLS authentication, and federated identity providers such as SAML 2.0 or OpenID Connect for single sign-on. In some cases, multi-factor authentication (MFA) is required, adding an extra layer of security by requiring users to provide additional verification beyond just a password.

By combining these approaches, a distributed system can achieve a high degree of flexibility, security, and reliability, supporting a wide range of use cases and integration scenarios.

In some implementations, data is stored by the hub without metadata. However, as described herein, it can be significant to store metadata in order to manage access, select the preferred data, conduct audits, and so forth. In some implementations, the hub stores metadata such as provenance data (e.g., the agent that submitted the data, time submitted, number of records submitted, number of files submitted, size of data submitted, and so forth). In some implementations, the hub associates confidence scores with data from particular agents or for particular data types. The confidence scores can be used, for example, to decide which data to use when another agent or system requests certain data from the hub. For example, if the hub stores credit score data, and there is data from an agent with a high confidence score and data from an agent with a low confidence score (e.g., due to missing data, inaccurate data, etc.), the hub can preferentially send the high confidence data in response to the request. In some implementations, metadata includes a time-to-live (TTL) or expiration. The TTL can specify how the data should be considered usable, and after that time passes, the hub can take various actions such as archiving the data, deleting the data, making the data unavailable in response to requests, and so forth.

The hub can be configured to store a wide variety of types of data, and can in some cases be configured to store data in arbitrary formats. In some implementations, the hub stores structured data (e.g., JSON, XML, etc.) or other types of data, such as binary blobs. In some implementations, the hub stores metadata indicating information such as content type, which can be used to locate requested information.

In some implementations, hash tables or distributed hash tables (DHTs) are used to enable efficient locating of information. As described herein, the hub can store large amounts of data across many different systems. Thus, efficient approaches for locating requested data can be significant.

A significant concern with centralized data collection is that the volume of data coming in or going out of the hub can fluctuate significantly over time. During periods of heavy loads, such as when multiple agents are sending large amounts of data to the hub, the hub can struggle to keep up with demands. In some implementations, agents are implemented to utilize differential transfers. For example, an agent can access a source and determine what has changed (e.g., new database entries since the last time the agent ran, files modified since the last time the agent ran, etc.). When using differential transfers, the agent sends only the information that is new or that has changed since the previous transfer to the hub. In some implementations, an agent can determine deletions and notify the hub of information that has been deleted from the source, which may trigger a process to delete such information from the hub, although in some implementations the hub may retain information that has been deleted from a source.

In some implementations, the hub applies rate limiting, such that any one agent is prevent from overloading the system during data transfers. In some implementations, rate limits are dynamic. For example, the hub can evaluate current loads (e.g., current file access demands or network utilization demands) and can determine a limit for an agent to transfer data into the hub or pull data from the hub. In some implementations, the hub can set a rate limit based on expected loads. For example, the hub can be configured to access information about scheduled jobs and thereby predict when there will be elevated demand. As another example, the hub can be configured to predict periods of high demand based on analysis of previous demand, for example as determined from access logs, network logs, and so forth.

In some implementations, the hub is configured to prevent flooding. For example, if a message rate exceeds a threshold, the hub can prevent further data transfer to or from a responsible agent or access node. This can be significant as high message rates could indicate that an agent is malfunctioning, for example, or could even indicate malicious behavior, such as an attempt to steal large amounts of information from the hub or to flood the hub with incoming data, which can overwhelm system resources, result in flawed or otherwise undesirable data being stored in the hub, or both.

Scalability can be a significant issue in centralized systems, such as the hub of a hub and spoke model. In conventional centralized systems, processing and storage typically occur on one server or a closely couple set of servers. While this architecture offers simplicity in design and management, it presents significant challenges as the volume or data or demand grows. Individual servers have limited ability to scale, leading to performance degradation, increased latency, and potential failures under heavy load.

To address the inherent scaling limitations of centralized systems, distributed architectures and various scaling techniques can be used. One common approach is sharding, in which a large database or dataset is divided into smaller, more manageable pieces (shards). Each shard can be hosted on a different server (although some servers can host most than one shard), slowing the system to distribute load and process queries in parallel across servers. For example, data can be sharded by type, region, etc. As an example, data can be sharded based on where it originated or the type of data it is, such as product data, security log data, customer information, order information, and so forth.

Another technique is regional replication, which can be used alongside or independently of sharding. Regional replication involves creating multiple copies of data, replicating services, or both, across multiple geographical regions. If one region becomes overloaded or experiences an outage, traffic can be redirected to a replica in another region, which can improve availability and help maintain consistent performance.

Other strategies can include, for example, load balancing, which distributes traffic across multiple servers, caching, which stores frequently accessed data in faster memory (e.g., RAM) to enable faster retrieval, and the use of microservices architectures, which can break down a larger application into smaller, independently-deployable services that can be scaled individually based on demand.

The techniques described herein can be combined in various ways to provide a hub and spoke system in which the hub acts as a central repository and manager of information while maintaining performance as the size of the data stored in the hub grows and demand on the hub increases.

In some implementations, the hub includes orchestration functionality. An orchestrator module can act as a conduct and decision-support mechanism. In some implementations, the orchestrator analyzes incoming information from agents and enriches it with contextual metadata. In some implementations, the orchestrator analyzing incoming data and makes decisions about downstream handling. For example, the orchestrator can evaluate the reliability of data, identify data that is relevant for particular workflows, and so forth. This can be significant as the hub can contain large amounts of data and it can be difficult for users to determine which data is most suited (e.g., most relevant, most reliable) for a particular task. The orchestrator can not only decide which agent or subsystem should consume or further process incoming data, but can also transform or annotate data to provide contextual information.

The orchestrator can include features such as rule-driven task delegation, multi-stage workflow assignment, and resource distribution. While the hub can take on a more active role via the use of an orchestrator, agents may be unaware of the processing and decision-making carried out by the orchestrator. Similarly, agents can remain unaware of other agents, thereby maintaining the modular hub and spoke structure.

In some implementations, the hub is configured to conduct certain analysis and take certain actions on its own. For example, the hub can be used for detecting operational issues, detecting security issues, performing automated remediation processes, centrally enforcing policies, and so forth. As an example, agents can publish status reports, error logs, compliance test outs, and the like to the hub. The hub (e.g., an agent or module of the hub) can use an embedded policy engine to evaluate incoming data against a repository of governance rules, operation thresholds, behavioral baselines (e.g., expected data transfer loads, expected transaction volumes), and so forth. When violations, anomalies, or non-compliance events are detected, the hub (e.g., a module of the hub) can initiate one or more actions, such as triggering an agent to perform a correction, terminating an errant process, or escalating alerts to administrators. This can be significant as the hub can generally have access to a greater set of data than any individual agent and can more easily find issues across data from multiple different agents.

Example Implementations

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application- and/or processing-related data. Logical component 102 can analyze data received from agents 104 and generate a software security label for an end-user (e.g., a user, customer, unskilled user)

to convey in an easily understood format whether a software application is safe to use. In some implementations, agents 104 can be a variety of data sources. For example, agents 104 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

FIGS. 2A and 2B illustrate example graphical labels according to some implementations. The label shown in FIG. 2A compares various data sources across various assessment domains. In FIG. 2A, the assessment domains include applicability (e.g., how applicable is a dataset to the problem being addressed), reliability (e.g., a measure of errors in the dataset), completeness (e.g., a measure of how much data is missing in the dataset, such as how many properties are not included in a property dataset), freshness (e.g., a measure of how current the dataset is). These are merely examples, and in practice there can be more, fewer, and/or different assessment domains. In FIGS. 2A and 2b, an overall score is shown, based on the scores for each assessment domain, although an overall score is not necessary. In FIGS. 2A and 2B, scores are assigned as high, medium, or low. However, it will be appreciated that other scoring approaches can be used. For example, numerical or letter grade scores are used in some implementations.

While FIG. 2A shows a label for comparing various data sources, FIG. 2B shows a label for assessing various agents. The same concept can be applied to artificial intelligence models more generally or to any other program, script, or the like. In FIG. 2B, agents are assessed across various domains including applicability, reliability, resiliency, and cost. Applicability can be a gauge of how well a model is suited to the particular task or problem space. Reliability can be an indication of how reliable the outputs of an agent or model are, for example, how often the agent takes actions that are consistent, correct, or both. Resiliency can be a measure of how an agent handles aberrant or missing data. For example, some agents may be able to operate effectively even when some errant data is input, while other agents may fail or produce erroneous outputs. Cost can be a measure of the computational demands associated with different agents. For example, a more complex agent can have greater computational demands and may cost more to run. In some cases, agents, models, or the like may be run by one or more third party services that charge based on usage, and such costs can be reflected in the cost assessment domain score.

Figure 3:
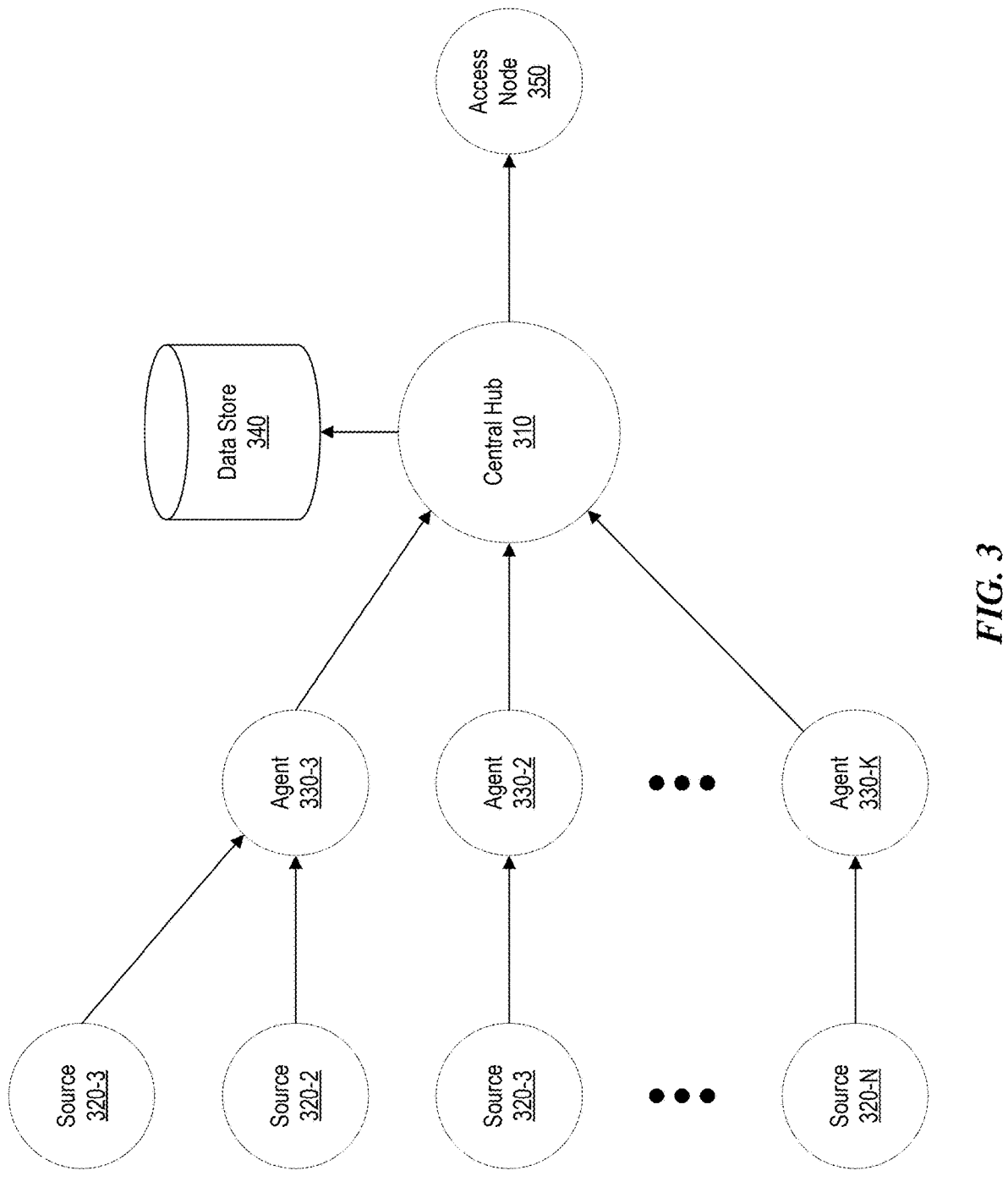
FIG. 3 is a diagram that schematically illustrates a hub and spoke system according to some implementations described herein.

FIG. 3 is a diagram that schematically illustrates a hub and spoke system according to some implementations described herein. A central hub 310 can act as a repository for information received from a variety of sources 320-1-320-N (generally, sources 320). In FIG. 3, four sources are illustrated. However, it will be appreciated that, in general, N can be any positive integer. Agents 330-1-330-N (generally, agents 330 or individually, agent 330), where N is again any positive integer, can access data in the sources 320. The agents 330 can submit information to the hub 310, which can store the information in a centralized repository or set of repositories. In some implementations, an agent can access data in the hub 310 and provide the data to a source or to any other system with access to the hub 310. In some implementations, an access node 350 can access information stored in the hub 310 but does not write data or otherwise cause data to be written into the hub 310. That is, the access node 350 can be a pure consumer of data. A source 320 can be a pure provider of data to the hub or can be mixed, both providing to the hub 310 and accessing data stored in the hub, either directly or indirectly, such as through an agent 330.

Figure 4:
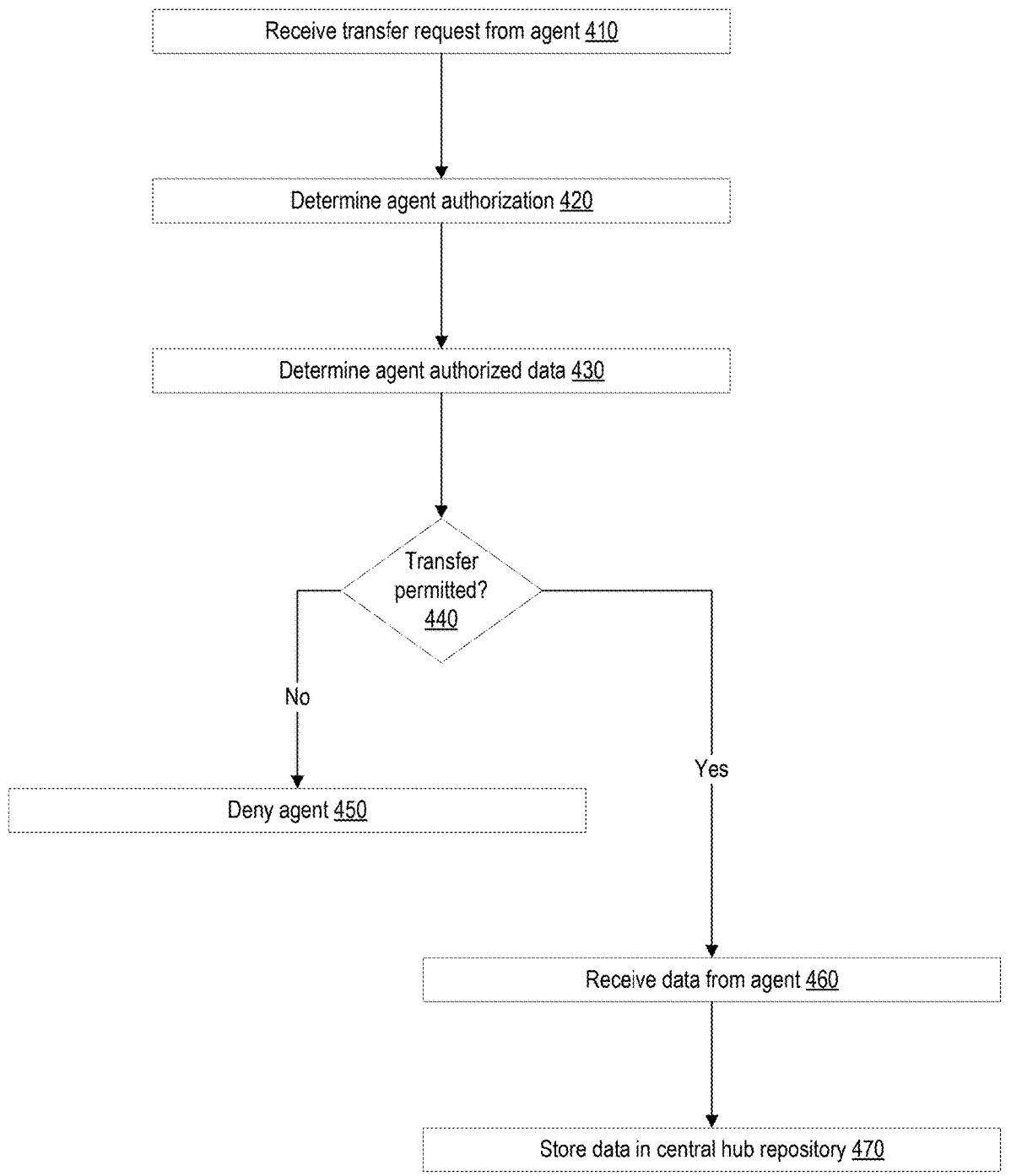
FIG. 4 is a block diagram of a flowchart for storing data in a central hub according to some implementations.

FIG. 4 is a block diagram of a flowchart for storing data in a central hub according to some implementations. At operation 410 the hub can receive a transfer request from an agent. The transfer request can include information about the agent (e.g., an identifier of the agent, an API key used by the agent, a credential used by the agent, etc.). At operation 420, the hub can determine an authorization of the agent, for example by checking the agent's identifier, API key, username, password, etc., against information about known agents. At operation 430, the hub can determine data the agent is permitted to transfer to the hub. For example, an agent may be permitted to transfer data from specific sources, in specific formats, etc., but not from other sources, in other formats, and so forth.

At operation 440, the hub can determine if the transfer is permitted, for example based on the determined agent authorization and the determined authorized transfer permissions. For example, the hub can compare the type of data the agent is trying to transfer to the type(s) of data the agent is allowed to transfer. For example, a transfer can be denied if an agent authorized to transfer web pages attempts to transfer executable code. If the transfer is not permitted, the hub can deny the agent's request at operation 450. In some implementations, the hub simply drops the request. In some implementations, the hub notifies the agent that the request was denied, which can aid in troubleshooting. In some implementations, the hub can block future attempts by the agent to transfer data to the hub. For example, if the hub determines that the agent shows signs of being hijacked or malfunctioning, the hub can block the agent to prevent potential impacts on the quality of the data stored in the hub or the availability of the hub.

If, at operation 440, the hub determines that the transfer is permitted, the hub can receive the data from the agent at operation 460 and store the data in a repository of the hub at operation 470.

Figure 5:
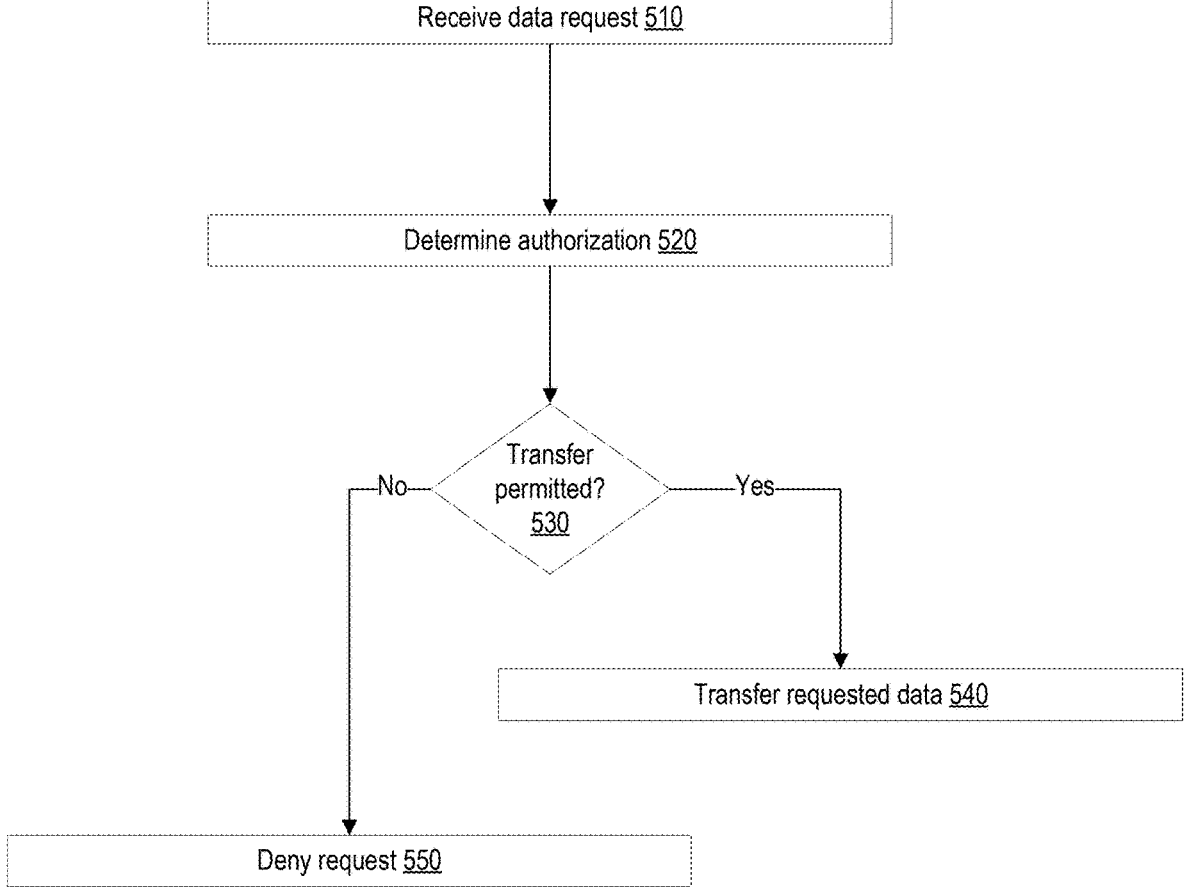
FIG. 5 is a block diagram of a flowchart for transferring data from a hub according to some implementations.

FIG. 5 is a block diagram of a flowchart for transferring data from a hub according to some implementations. At operation 510, the hub can receive a data request for data stored in the hub. At operation 520, the system can determine authorization, for example based on an identifier, API key, etc., provided by the requestor. At operation 530, the hub can determine if the transfer is permitted, for example based on the determined authorization. If so, the hub can transfer the data to the requestor at operation 540 if the data exists. If the data does not exist, the hub can alternatively send a notification or error message to the requestor indicating that the data is not available.

If the transfer is not permitted at operation 530, the system can deny the request at operation 550. In some implementations, the hub provides a notification or error message to the requestor. This can indicate, for example, that the requestor lacks sufficient permissions.

Figure 6:
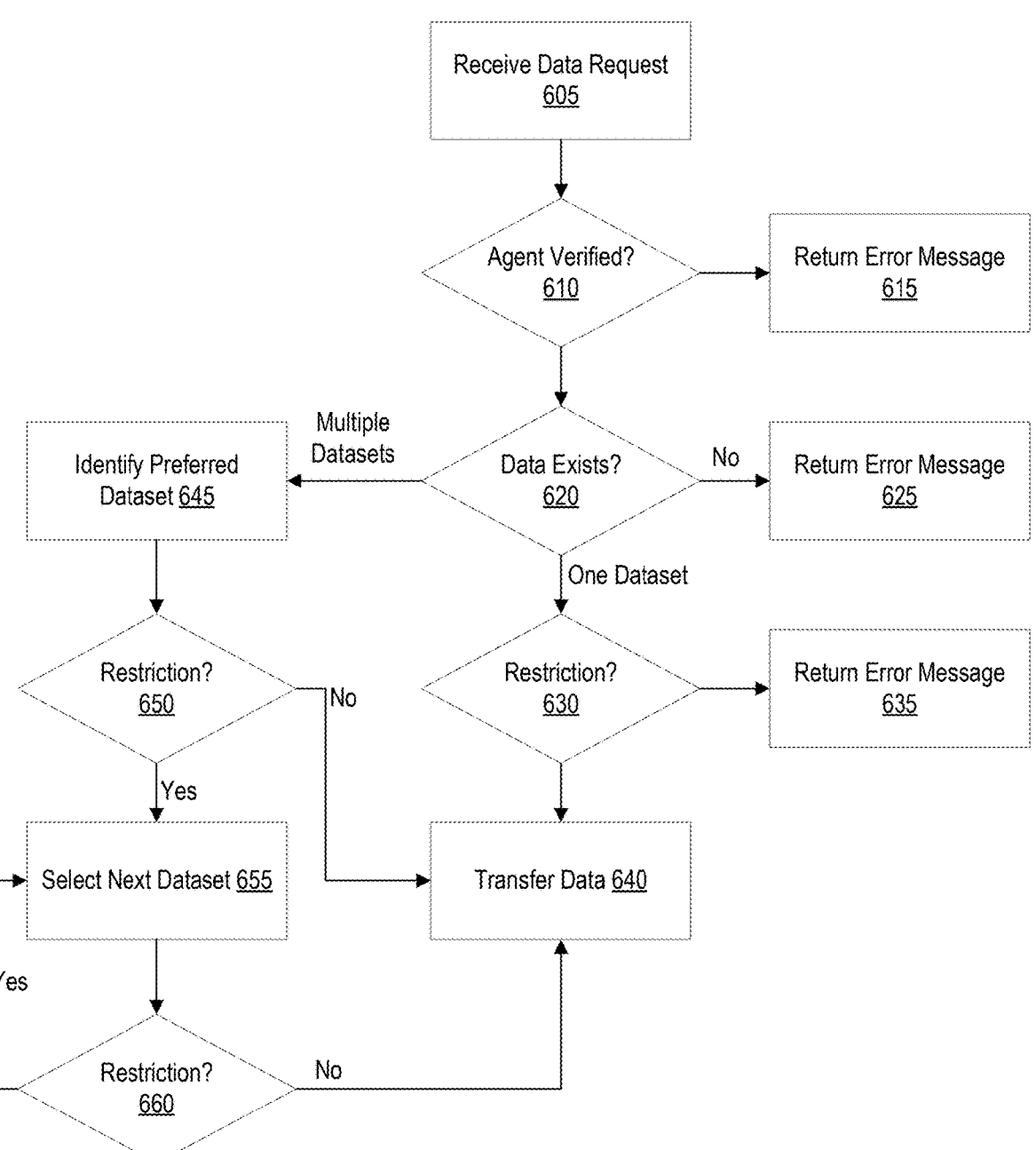
FIG. 6 is a block diagram of a flowchart from transferring data from a hub in response to a request from an agent according to some implementations.

FIG. 6 is a block diagram of a flowchart from transferring data from a hub in response to a request from an agent according to some implementations. At operation 605, the hub can receive a data request from an agent. At operation 610, the hub can determine if the agent is verified and authorized to receive the requested data. If not, the hub can return an error message at operation 615. The error message can be specific (e.g., informing the agent that it could not be verified) or can be more generic (e.g., a generic error indicating that the request could not be fulfilled). A more generic message can make it more difficult for an attacker or unauthorized user to figure out why their requests are failing, but can also make it more difficult to troubleshoot issues with fulfilling requests from legitimate agents.

At operation 620, the hub can determine if the requested data exists. If not, the hub can return an error message to the agent at operation 625. If the data exists one dataset, the hub can determine if the dataset is restricted at operation 630. For example, a dataset may be restricted because the only certain agents can access it, because the dataset is deemed to have expired in general, because the dataset can't be used due specific business rule restrictions, etc. If the dataset is restricted, the hub can return an error message at operation 635. If not, the hub can transfer the data at operation 640.

If, at operation 620, there are multiple datasets, the hub can identify a preferred dataset. For example, a preferred dataset can be selected based on the agent that provided the dataset, an age of the dataset, etc. At operation 650, the hub can determine if there are any restrictions on the preferred dataset. If not, the hub can transfer the data at operation 640. If there is a restriction on the preferred dataset, the hub can select the next dataset at operation 655. At operation 660, the hub can evaluate the next dataset and determine if there is a restriction. If not, the hub can transfer the next dataset at operation 640. If so, the hub can select another dataset of operation 655. The process can continue until a dataset without a restriction is identified or until all datasets are exhausted, in which case an error message can be return by the hub.

In some implementations, the data transfer at operation 640 includes only the requested data. In some implementations, additional information is included, such as expiration date, source, agent that provided the data, confidence level associated with the data, and so forth.

Suitable Computing Environments

Figure 7:
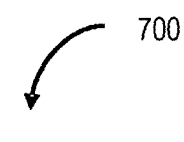
FIG. 7 is a block diagram showing some of the components typically incorporated in at least some of the computer systems and other devices on which the disclosed platform operates.

FIG. 7 is a block diagram showing some of the components typically incorporated in at least some of the computer systems and other devices on which the disclosed platform operates. In various implementations, these computer systems and other device(s) 700 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 704, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 706, including display screens (e.g., LCD, OLED, CRT, etc.), speakers, 3.5 mm output jack, lights, LED's, haptic motors, HDMI output connections, VGA output connections, USB output connections, or other output-related components; processor(s) 708, including a central processing unit (CPU) for executing computer programs, a graphical processing unit (GPU) for executing computer graphic programs and handling computing graphical elements; storage(s) 710, including at least one computer memory for storing programs (e.g., application(s) 712, model(s) 714, and/or other programs) and data while they are being used, an operating system including a kernel, and device drivers; a network connection component(s) 716 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 718, such as a hard drive or flash drive for persistently storing programs and data; and computer-readable media drives 720 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the platform, those skilled in the art will appreciate that the platform may be implemented using devices of various types and configurations, and having various components.

Figure 8:
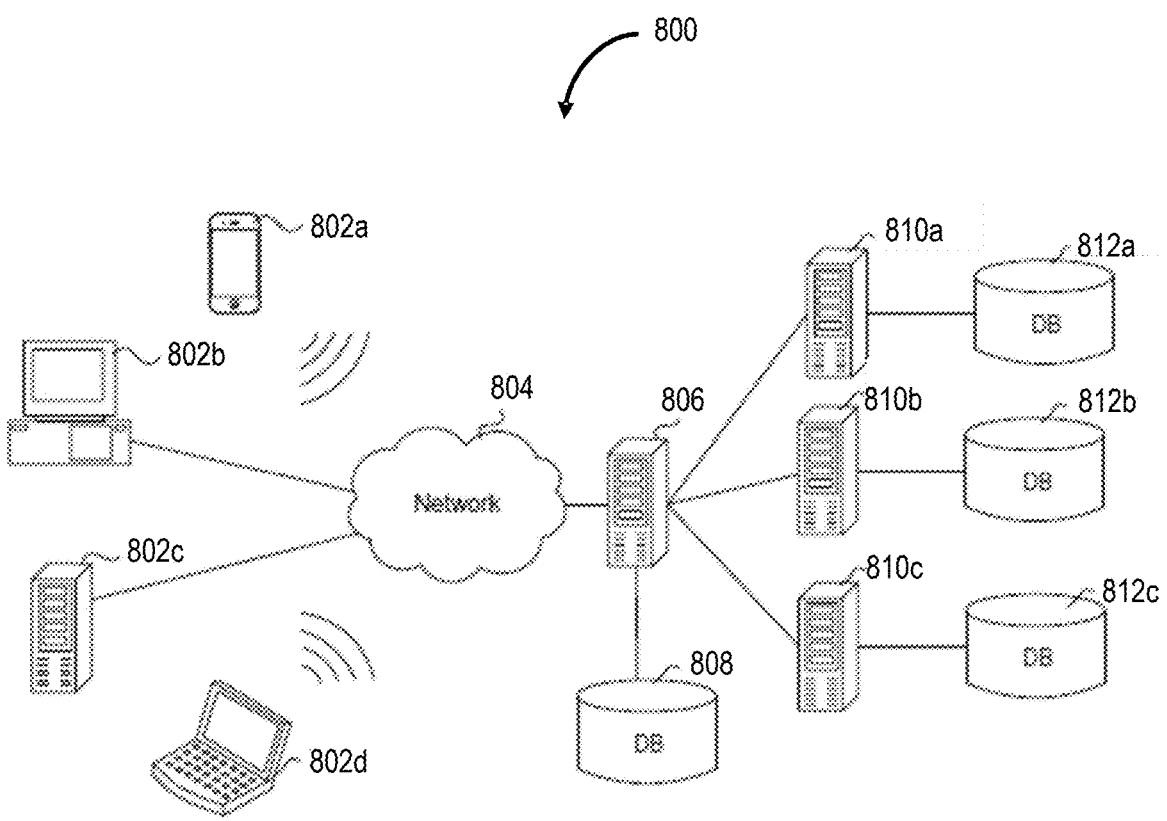
FIG. 8 is a system diagram illustrating an example of a computing environment in which the disclosed platform operates in some implementations.

FIG. 8 is a system diagram illustrating an example of a computing environment in which the disclosed platform operates in some implementations. In some implementations, environment 800 includes one or more client computing devices 902a-d. For example, the computing devices 902a-d can comprise distributed entities a-d, respectively. Client computing devices 802 operate in a networked environment using logical connections through network 804 to one or more remote computers, such as a server computing device. In some implementations, client computing devices 802 may correspond to device 700 (FIG. 7).

In some implementations, server computing device 806 is an edge server which receives client requests and coordinates fulfillment of those requests through other servers, such as servers 910a-c. In some implementations, server computing devices 806 and 810 (e.g., 910a, 910b, 910c) comprise computing systems. Though each server computing device 806 and 810 is displayed logically as a single server, server computing devices can each be a distributed computing environment encompassing multiple computing devices located at the same or at geographically disparate physical locations. In some implementations, each server computing device 810 corresponds to a group of servers. In some implementations, one or more server computing device 810 is a virtualized server and can operate on physical hardware that runs multiple virtualized servers.

Client computing devices 802 and server computing devices 806 and 810 can each act as a server or client to other server or client devices. In some implementations, server computing devices (806, 910a-c) connect to a corresponding database (808, 912a-c). As discussed above, each server 810 can correspond to a group of servers, and each of these servers can share a database or can have its own database and/or other data storage capabilities.

The platform can utilize one or more machine learning models. The one or more machine learning models can include supervised learning models, unsupervised learning models, semi-supervised learning models, and/or reinforcement learning models. Examples of machine learning models suitable for use with the present technology include, but are not limited to: large language models, regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), decision engines, rules engines, Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 9). The training data or training set can be created by generating pairs of features (e.g., feature vectors) and/or ground-truth labels/values based on any of the data stored in databases 808 and 812. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 808 and 812 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 808 and 812 are displayed logically as single units, databases 808 and 812 can each be a distributed computing environment encompassing multiple computing devices, can be located within their corresponding server, or can be located at the same or at geographically disparate physical locations.

Network 804 can be a local area network (LAN) or a wide area network (WAN), but can also be other wired or wireless networks. In some implementations, network 804 is the Internet or some other public or private network. Client computing devices 802 are connected to network 804 through a network interface, such as by wired or wireless communication. While the connections between server computing device 806 and server computing device 810 are shown as separate connections, these connections can be any kind of local, wide area, wired, or wireless network, including network 804 or a separate public or private network.
Machine Learning Model(s)

Figure 9:
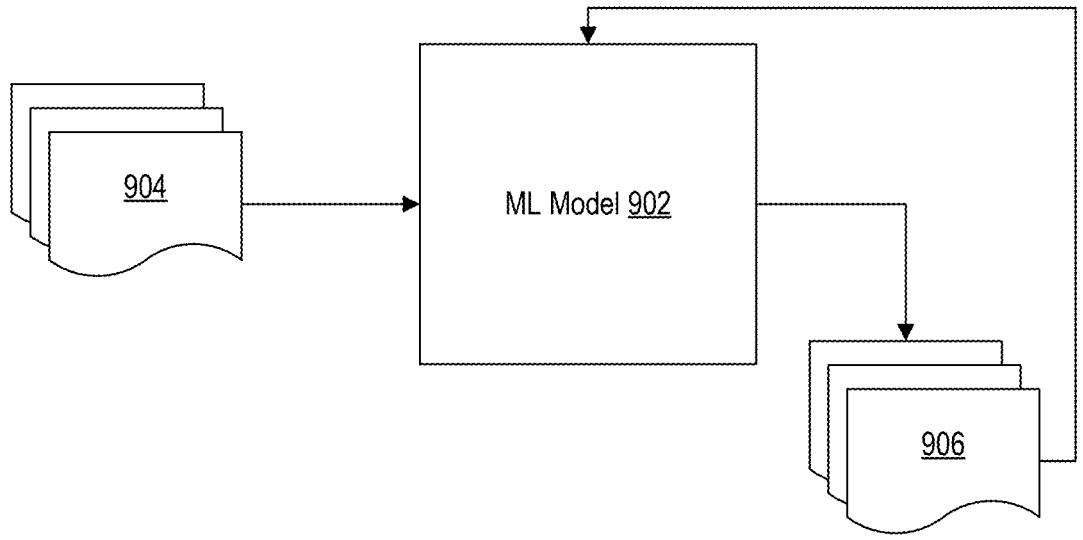
FIG. 9 is an illustrative diagram illustrating a machine learning model, in accordance with some implementations of the present technology.

FIG. 9 is an illustrative diagram illustrating a machine learning model, in accordance with some implementations of the present technology.

In some implementations, the machine learning model 902 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free flowing, with connections interacting in a more chaotic and complex fashion.

As an example, with respect to FIG. 9, machine learning model 902 can take inputs 904 and provide outputs 906. In one use case, outputs 906 may be fed back to machine learning model 902 as input to train machine learning model 902 (e.g., alone or in conjunction with user indications of the accuracy of outputs 906, labels associated with the inputs, or with other reference feedback information). In another use case, machine learning model 902 may update its configurations (e.g., weights, biases, or other parameters) based on its assessment of its prediction (e.g., outputs 906) and reference feedback information (e.g., user indication of accuracy, reference labels, or other information). In another use case, where machine learning model 902 is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model 902 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 902 can be a blackboard machine learning model. A blackboard machine learning model can represent a blackboard architectural model where a common knowledge base (e.g., the "blackboard") is updated by differing data sources. For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, artificial intelligence models, machine learning models, etc.) to update the blackboard machine learning model with one or more partial solutions. In some implementations, the data sources may "publish"

information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem.

Evaluation Platform

In the following discussion, reference is made to users. However, it will be appreciated that users are not necessarily human users but can instead be, for example, agents configured to act autonomously or semi-autonomously. Additionally, the discussion below can be readily expanded to different types of models, different use cases, and so forth.

Figure 10:
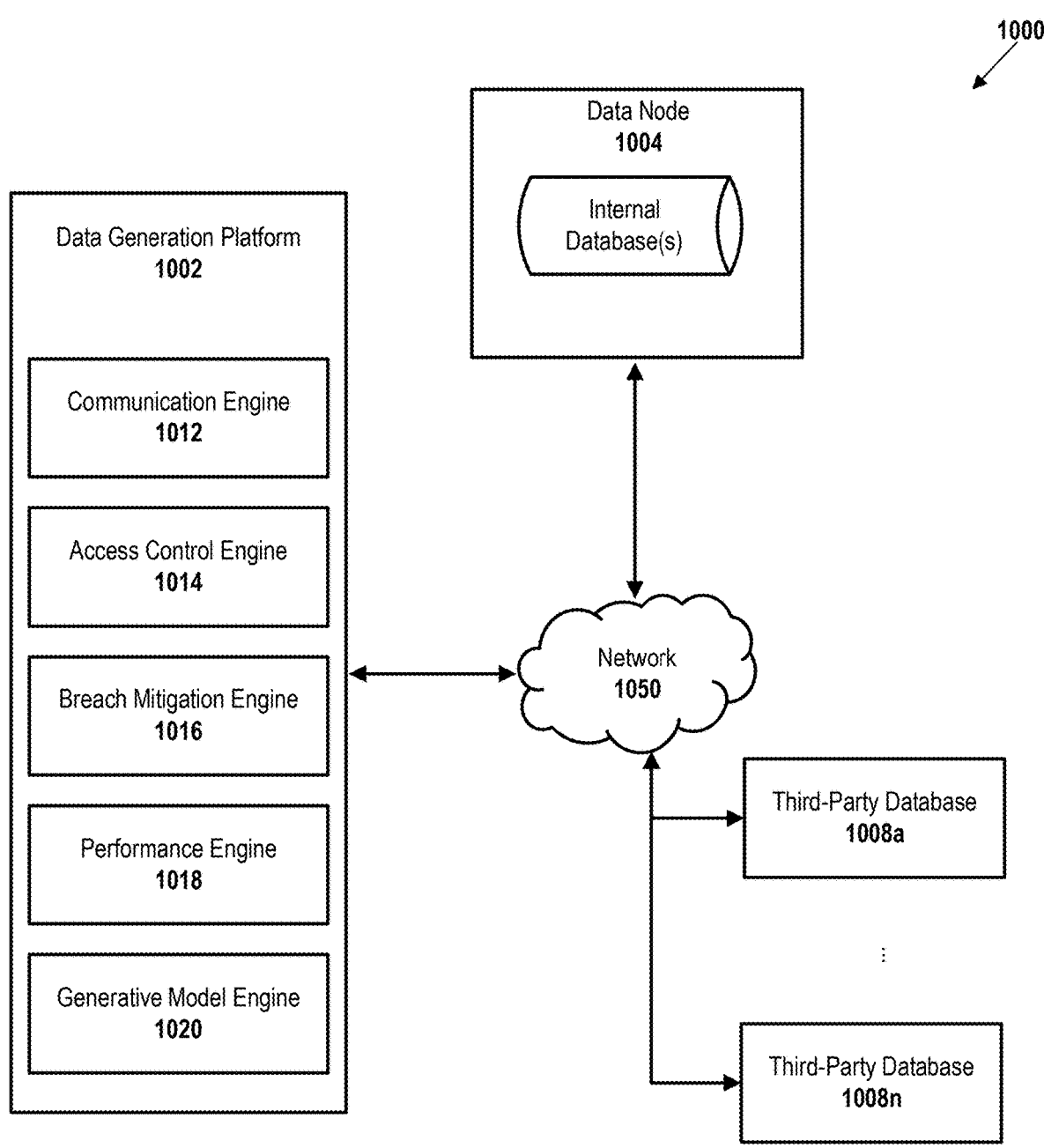
FIG. 10 shows an illustrative environment 1000 for evaluating machine learning model inputs (e.g., language model prompts) and outputs for model selection and validation, in accordance with some implementations of the present technology.

FIG. 10 shows an illustrative environment 1000 for evaluating machine learning model inputs (e.g., language model prompts) and outputs for model selection and validation, in accordance with some implementations of the present technology. For example, the environment 1000 includes the data generation platform 1002, which is capable of communicating with (e.g., transmitting or receiving data to or from) a data node 1004 and/or third-party databases 1008a-1008n via a network 1050. The data generation platform 1002 can include software, hardware, or a combination of both and can reside on a physical server or a virtual server running on a physical computer system. For example, the data generation platform 1002 can be distributed across various nodes, devices, or virtual machines (e.g., as in a distributed cloud server). In some implementations, the data generation platform 1002 can be configured on a user device (e.g., a laptop computer, smartphone, desktop computer, electronic tablet, or another suitable user device). Furthermore, the data generation platform 1002 can reside on a server or node and/or can interface with third-party databases 1008a-1008n directly or indirectly.

The data node 1004 can store various data, including one or more machine learning models, prompt validation models, associated training data, user data, performance metrics and corresponding values, validation criteria, and/or other suitable data. For example, the data node 1004 includes one or more databases, such as an event database (e.g., a database for storage of records, logs, or other information associated with LLM-related user actions), a vector database, an authentication database (e.g., storing authentication tokens associated with users of the data generation platform 1002), a secret database, a sensitive token database, and/or a deployment database.

An event database can include data associated with events relating to the data generation platform 1002. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 1002 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 1002). By doing so, the data generation platform 1002 can store and track information relating to performance, errors, and troubleshooting. The data generation platform 1002 can include one or more subsystems or subcomponents. For example, the data generation platform 1002 includes a communication engine 1012, an access control engine 1014, a breach mitigation engine 1016, a performance engine 1018, and/or a generative model engine 1020.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 1002 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 1002 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 1002 or associated development pipeline. For example, the authentication database stores keys (e.g., public keys that match private keys linked to users and/or devices). The authentication database can include other user or device information (e.g., user identifiers, such as usernames, or device identifiers, such as media access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 1002 can evaluate prompts and/or outputs to prevent breaches or leakage of such sensitive information.

A deployment database can include data associated with deploying, using, or viewing results associated with the data generation platform 1002. For example, the deployment database can include a server system (e.g., physical or virtual) that stores validated outputs or results from one or more LLMs, where such results can be accessed by the requesting user.

The data generation platform 1002 can receive inputs (e.g., prompts), training data, validation criteria, and/or other suitable data from one or more devices, servers, or systems. The data generation platform 1002 can receive such data using communication engine 1012, which can include software components, hardware components, or a combination of both. For example, the communication engine 1012 includes or interfaces with a network card (e.g., a wireless network card and/or a wired network card) that is associated with software to drive the card and enables communication with network 1050. In some implementations, the communication engine 1012 can also receive data from and/or communicate with the data node 1004, or another computing device. The communication engine 1012 can communicate with the access control engine 1014, the breach mitigation engine 1016, the performance engine 1018, and the generative model engine 1020.

In some implementations, the data generation platform 1002 can include the access control engine 1014. The access control engine 1014 can perform tasks relating to user/device authentication, controls, and/or permissions. For example, the access control engine 1014 receives credential information, such as authentication tokens associated with a requesting device and/or user. In some implementations, the access control engine 1014 can retrieve associated stored credentials (e.g., stored authentication tokens) from an authentication database (e.g., stored within the data node 1004). The access control engine 1014 can include software components, hardware components, or a combination of both. For example, the access control engine 1014 includes one or more hardware components (e.g., processors) that are able to execute operations for authenticating users, devices, or other entities (e.g., services) that request access to an LLM associated with the data generation platform 1002. The access control engine 1014 can directly or indirectly access data, systems, or nodes associated with the third-party databases 1008a-1008n and can transmit data to such nodes. Additionally or alternatively, the access control engine 1014 can receive data from and/or send data to the communication engine 1012, the breach mitigation engine 1016, the performance engine 1018, and/or the generative model engine 1020.

The breach mitigation engine 1016 can execute tasks relating to the validation of inputs and outputs associated with the LLMs. For example, the breach mitigation engine 1016 validates inputs (e.g., prompts) to prevent sensitive information leakage or malicious manipulation of LLMs, as well as validate the security or safety of the resulting outputs. The breach mitigation engine 1016 can include software components (e.g., modules/virtual machines that include prompt validation models, performance criteria, and/or other suitable data or processes), hardware components, or a combination of both. As an illustrative example, the breach mitigation engine 1016 monitors prompts for the inclusion of sensitive information (e.g., PII), or other forbidden text, to prevent leakage of information from the data generation platform 1002 to entities associated with the target LLMs. The breach mitigation engine 1016 can communicate with the communication engine 1012, the access control engine 1014, the performance engine 1018, the generative model engine 1020, and/or other components associated with the network 1050 (e.g., the data node 1004 and/or the third-party databases 1008a-1008n).

The performance engine 1018 can execute tasks relating to monitoring and controlling performance of the data generation platform 1002 (e.g., or the associated development pipeline). For example, the performance engine 1018 includes software components (e.g., performance monitoring modules), hardware components, or a combination thereof. To illustrate, the performance engine 1018 can estimate performance metric values associated with processing a given prompt with a selected LLM (e.g., an estimated cost or memory usage). By doing so, the performance engine 1018 can determine whether to allow access to a given LLM by a user, based on the user's requested output and the associated estimated system effects. The performance engine 1018 can communicate with the communication engine 1012, the access control engine 1014, the performance engine 1018, the generative model engine 1020, and/or other components associated with the network 1050 (e.g., the data node 1004 and/or the third-party databases 1008a-1008n).

The generative model engine 1020 can execute tasks relating to machine learning inference (e.g., natural language generation based on a generative machine learning model, such as an LLM). The generative model engine 1020 can include software components (e.g., one or more LLMs, and/or API calls to devices associated with such LLMs), hardware components, and/or a combination thereof. To illustrate, the generative model engine 1020 can provide users' prompts to a requested, selected, or determined model (e.g., LLM) to generate a resulting output (e.g., to a user's query within the prompt). As such, the generative model engine 1020 enables flexible, configurable generation of data (e.g., text, code, or other suitable information) based on user input, thereby improving the flexibility of software development or other such tasks. The generative model engine 1020 can communicate with the communication engine 1012, the access control engine 1014, the performance engine 1018, the generative model engine 1020, and/or other components associated with the network 1050 (e.g., the data node 1004 and/or the third-party databases 1008a-1008n).

Engines, subsystems, or other components of the data generation platform 1002 are illustrative. As such, operations, subcomponents, or other aspects of particular subsystems of the data generation platform 1002 can be distributed, varied, or modified across other engines. In some implementations, particular engines can be deprecated, added, or removed. For example, operations associated with breach mitigation are performed at the performance engine 1018 instead of at the breach mitigation engine 1016.

Figure 11:
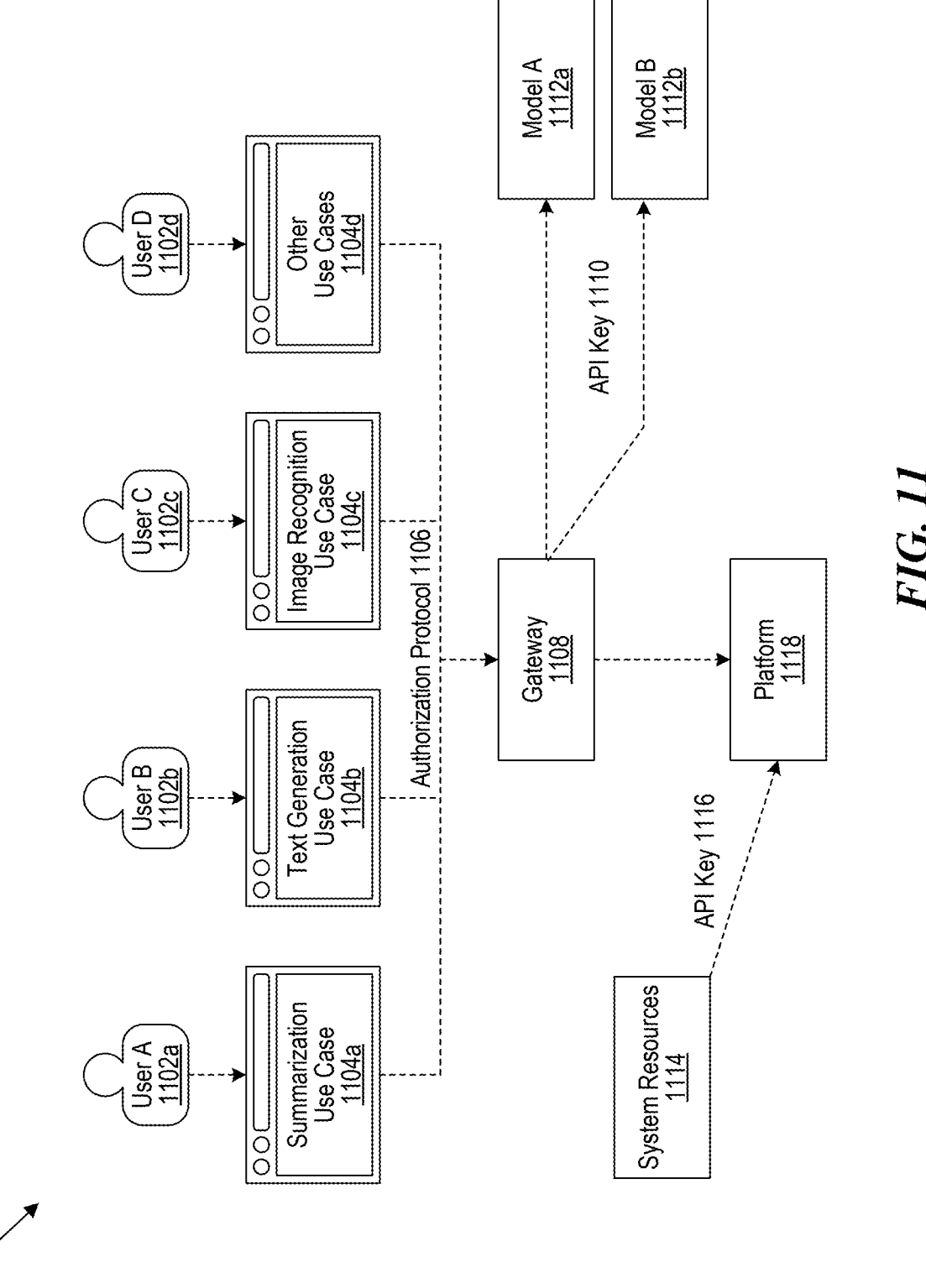
FIG. 11 is an illustrative diagram illustrating an example environment 1100 of a platform 1118 for dynamically selecting models and infrastructure to process a request with the selected models, in accordance with some implementations of the present technology.

FIG. 11 is an illustrative diagram illustrating an example environment 1100 of a platform 1118 for dynamically selecting models and infrastructure to process a request with the selected models, in accordance with some implementations of the present technology. Environment 1100 includes users 1102a-d, use cases 1104a-d, authorization protocol 1106, gateway 1108, API key 1110, 1116, models 1112a-b, system resources 1114, and platform 1118. Platform 1118 can be the same as or similar to data generation platform 1002 with reference to FIG. 10. Likewise, implementations of example environment 1100 can include different and/or additional components or can be connected in different ways.

Users 1102a-d can each represent different individuals or entities who interact with the platform by submitting inputs (e.g., input inquiry, prompt, query) in an output generation request to be processed subsequently by the platform 1118 to select appropriate models and resources. Each user 1102a-d can have distinct requirements and use cases, such as summarization use case 1104a, text generation use case 1104b, image recognition use case 1104c, and/or other use cases 1104d. For example, the summarization use case 1104a can include generating a concise summary of a given text input. The user 1102a submits a text document or a large body of text, and the platform 1118 processes the text document to produce a shorter version that captures the representative points and information of the text document. Additionally, the text generation use case 1104b can include generating new text based on a given prompt or input. The user 1102b provides a starting sentence, topic, or context, and the platform generates coherent and contextually relevant text. For instance, a user can provide a prompt like "Once upon a time in a faraway land," and the platform generates a continuation of the story. Further, the image recognition use case 1104c can include analyzing and identifying objects, features, or patterns within an image. The user 1102c submits an image, and the platform processes the image to recognize and label the contents. For example, a user can upload a photo of a crowded street, and the platform identifies and labels objects such as cars, pedestrians, traffic lights, and buildings.

The authorization protocol 1106 ensures that only authorized users and devices can access the platform 1118 by managing authentication and authorization processes, verifying user identities, and granting appropriate access rights based on predefined policies. The authorization protocol 1106 can include one or more of, for example, multi-factor authentication, OAuth tokens, or other security measures to ensure access control. In some implementations, the authorization protocol can also include biometric verification or hardware-based security modules for improved security.

The gateway 1108 is an entry point for output generation requests submitted by users 1102a-d, routing the output generation requests to the platform 1118. The gateway 1108 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 1102a-d and the platform 1118. In some implementations, the gateway 1108 is a microservices-based architecture that allows for scalable and modular handling of requests. For example, when user 1102a submits a text summarization request, the gateway 1108 balances the load by directing the request to an available instance (e.g., platform 1118), transforms the data format if needed, and/or translates the protocol to ensure compatibility before transmitting the request to the platform 1118. The platform 1118 processes the request, and the gateway 1108 returns the summarized text to the user.

In some implementations, when a user submits a request, the gateway 1108 first intercepts the request and checks for the presence of a valid API key 1110. The API key 1110, which serves as a unique identifier, is verified against the authorization protocol 1106. API key 1110 is used to authenticate (e.g., via authorization protocol 1106) and authorize API requests to ensure that only valid requests from authorized users or systems are processed by the platform. Once authenticated, the authorization protocol 1106 can check the associated permissions and roles linked to the API key 1110 to determine if the user has the necessary access rights to perform the requested action. If the API key 1110 is valid and the user is authorized, the gateway 1108 routes the request to the appropriate components within the platform 1118. This interaction ensures that only authorized users can access the platform's resources, maintaining the security and integrity of the system. In some implementations, the authorization protocol 1106 can also enforce additional security measures, such as rate limiting and logging, to further protect the platform from unauthorized access and abuse. In some implementations, API key 1110 can be supplemented with JWT (JSON Web Tokens) for stateless authentication and improved security.

Models 1112a-b are the different models (e.g., AI models, machine learning models, LLMs) accessible by the platform 1118. The models 1112a-b can have different capabilities and performance properties or attributes. The platform 1118 dynamically selects the most appropriate model(s) within models 1112a-b based on the output generation request of the user 1102a-d that specifies the use case 1104a-d. The models 1112a-b can include, for example, deep learning models, decision trees, or ensemble methods, depending on the use case 1104a-d. In some implementations, the platform can use a model registry to manage and version control the models 1112a-b to ensure that the most up-to-date and accurate versions of models 1112a-b are used for processing the output generation request.

Similarly to API key 1110, API key 1116 can be used to verify the system resources 1114 accessible by the users 1102a-d. System resources 1114 include the computational and storage resources used to process output generation request, encompassing CPU, GPU, memory, and/or other software, hardware, and/or network components that the platform allocates dynamically. The platform can use container orchestration tools such as KUBERNETES to manage the system resources 1114. In some implementations, the platform could leverage cloud-based infrastructure for elastic scaling and cost efficiency.

FIG. 12 is a flow diagram illustrating a process 1200 for the dynamic selection of models and infrastructure to process the request with the selected models based on evaluation of user prompts, in accordance with some implementations of the present technology.

In operation 1202, the system receives, from a computing device, an output generation request including an input (e.g., a prompt, query, input query, request) for generation of an output using one or more models (e.g., AI models) of a plurality of models. In some implementations, at least one AI model in the plurality of AI models is a Large Language Model (LLM). The request can be received, for example, via an API endpoint exposed by a gateway, which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be pre-processed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, an LLM can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 1204, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 1206, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 1208, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 1210, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 1212, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues,"

while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A computer-implemented method for centralized data management, the method comprising:
 receiving, from a first agent, a data request for data stored by a central hub,
 wherein the first agent is configured to receive one or more inputs and to perform one or more actions autonomously or semi-autonomously in response to the one or more inputs;
 determining that the first agent is authorized to issue the data request;
 identifying a dataset in a data store of the central hub that is responsive to the data request;
 determining if the dataset is not a restricted dataset; and
 when the dataset is not a restricted dataset:
 transmitting the dataset to the first agent;

when the dataset is a restricted dataset:
 identifying a second dataset in the data store that is responsive to the data request and is different from the restricted dataset; and
 transmitting the second dataset to the first agent,
 wherein the second dataset is not a restricted dataset,
 wherein the first agent has permission to access the second dataset,
 wherein the transmitted dataset is transmitted to the data store from a second agent different from the first agent,
 wherein the first agent does not communicate with the second agent,
 wherein transmitting the transmitted dataset comprises transmitting an identifier of the second agent, and
 wherein transmitted the transmitted dataset comprises transmitting an expiration date of the transmitted dataset.

2. A computer-implemented method for centralized data management, the method comprising:
 receiving, from a first agent, a data request,
 wherein the first agent is configured to access one or more inputs and to perform one or more actions in response to the one or more inputs;
 determining that the first agent is authorized to issue the data request;
 identifying a dataset in a data store that is responsive to the data request;
 determining if the dataset is not a restricted dataset; and
 when the dataset is not a restricted dataset:
 determining that a second agent is providing information for updating the dataset, wherein the second agent is different from the first agent;
 updating the dataset; and
 transmitting the dataset to the first agent upon completion of the update,
 wherein the first agent does not communicate with the second agent.

3. The computer-implemented method of claim 2, further comprising:
 transmitting at least one of an identifier of the second agent, an expiration date of the dataset, or a confidence level associated with the dataset to the first agent.

4. The computer-implemented method of claim 2, further comprising, when the dataset is a restricted dataset:
 identifying a second dataset responsive to the data request; and
 transmitting the second dataset to the first agent,
 wherein the second dataset is not a restricted dataset,
 wherein the second dataset is different from the first dataset, and
 wherein the first agent has access permissions for the second dataset.

5. The computer-implemented method of claim 2, wherein the request comprises a subscription request.

6. The computer-implemented method of claim 2, further comprising:
 determining an addition of new data responsive to the data request; and
 transmitting the new data to the first agent.

7. The computer-implemented method of claim 2, wherein the updating is done as one or more atomic transactions.

8. The computer-implemented method of claim 2, further comprising:
 determining, using the provided information, an updated confidence level for the second agent, wherein the updated confidence level is based on one or more of: a size of the provided information, a frequency of updates by the second agent, or a security measure taken by the second agent.

9. The computer-implemented method of claim 8, wherein the security measure includes an attestation signed by a hardware module of a system on which the second agent is operating.

10. The computer-implemented method of claim 2, further comprising: applying a transformation to the provided information.

11. The computer-implemented method of claim 2, further comprising:

receiving, from a third agent, data that conflicts with the dataset from the second agent; and resolving the conflict by preferring the dataset from the second agent based on a preference configuration, wherein the third agent acts as a fallback agent when the second agent has not submitted data within a threshold period of time.

12. A system for centralized data management, the system comprising:

at least one hardware processor; and at least one non-transitory, computer-readable storage medium having instructions thereon that, when executed by the at least one hardware processor, cause the system to:

receive, from a first agent, a data request, wherein the first agent is configured to access one or more inputs and to perform one or more actions in response to the one or more inputs;

determine that the first agent is authorized to issue the data request;

identify a dataset in a data store that is responsive to the data request;

determine if the dataset is not a restricted dataset; and when the dataset is not a restricted dataset:

determine that a second agent is providing information for updating the dataset, wherein the second agent is different from the first agent;

update the dataset; and transmit the dataset to the first agent upon completion of the update, wherein the first agent does not communicate with the second agent.

13. The system of claim 12, wherein the instructions are further configured to cause the system to:

transmit at least one of an identifier of the second agent, an expiration date of the dataset, or a confidence level associated with the dataset to the first agent.

14. The system of claim 12, wherein the instructions are further configured to cause the system to, when the dataset is a restricted dataset:

identify a second dataset responsive to the data request; and transmit the second dataset to the first agent, wherein the second dataset is not a restricted dataset, wherein the second dataset is different from the first dataset, and wherein the first agent has access permissions for the second dataset.

15. The system of claim 12, wherein the request comprises a subscription request.

16. The system of claim 12, wherein the instructions are further configured to cause the system to:

determine an addition of new data responsive to the data request; and transmit the new data to the first agent.

17. The system of claim 12, wherein the updating is done as one or more atomic transactions.

18. The system of claim 12, wherein the instructions are further configured to cause the system to:

determine, using the provided information, an updated confidence level for the second agent, wherein the updated confidence level is based on one or more of: a size of the provided information, a frequency of updates by the second agent, or a security measure taken by the second agent.

19. The system of claim 18, wherein the security measure includes an attestation signed by a hardware module of a system on which the second agent is operating.

20. The system of claim 12, wherein the instructions are further configured to cause the system to:

receive, from a third agent, data that conflicts with the dataset from the second agent; and resolve the conflict by preferring the dataset from the second agent based on a preference configuration, wherein the third agent acts as a fallback agent when the second agent has not submitted data within a threshold period of time.

21. A computer-implemented method for centralized data management, the method comprising:

receiving, from a first agent, a data request, wherein the first agent is configured to access one or more inputs and to perform one or more actions in response to the one or more inputs;

determining that the first agent is authorized to issue the data request;

identifying a dataset in a data store that is responsive to the data request;

determining if the dataset is not a restricted dataset; and when the dataset is not a restricted dataset:

determining that the second agent is providing information for updating the dataset;

updating the dataset, wherein the updating is done as one or more atomic transactions; and transmitting the dataset to the first agent, wherein the dataset is transmitted to the data store from a second agent different from the first agent, wherein the first agent does not communicate with the second agent.

22. A computer-implemented method for centralized data management, the method comprising:

receiving, from a first agent, a data request, wherein the first agent is configured to access one or more inputs and to perform one or more actions in response to the one or more inputs;

determining that the first agent is authorized to issue the data request;

identifying a dataset in a data store that is responsive to the data request;

determining if the dataset is not a restricted dataset; and when the dataset is not a restricted dataset:

determining that the second agent is providing information for updating the dataset;

updating the dataset;

determining, using the provided information, an updated confidence level for the second agent; and transmitting the dataset to the first agent, wherein the dataset is transmitted to the data store from a second agent different from the first agent, wherein the first agent does not communicate with the second agent.

23. A system for centralized data management, the system comprising:

at least one hardware processor; and at least one non-transitory, computer-readable storage medium having instructions thereon that, when executed by the at least one hardware processor, cause the system to:

receive, from a first agent, a data request, wherein the first agent is configured to access one or more inputs and to perform one or more actions in response to the one or more inputs;

determine that the first agent is authorized to issue the data request;

identify a dataset in a data store that is responsive to the data request;

determine if the dataset is not a restricted dataset; and when the dataset is not a restricted dataset:

determine that the second agent is providing information for updating the dataset;

update the dataset, wherein the updating is done as one or more atomic transactions; and transmit the dataset to the first agent, wherein the dataset is transmitted to the data store from a second agent different from the first agent, wherein the first agent does not communicate with the second agent.

24. A system for centralized data management, the system comprising:

at least one hardware processor; and at least one non-transitory, computer-readable storage medium having instructions thereon that, when executed by the at least one hardware processor, cause the system to:

receive, from a first agent, a data request, wherein the first agent is configured to access one or more inputs and to perform one or more actions in response to the one or more inputs;

determine that the first agent is authorized to issue the data request;

identify a dataset in a data store that is responsive to the data request;

determine if the dataset is not a restricted dataset; and when the dataset is not a restricted dataset:

determine that the second agent is providing information for updating the dataset;

update the dataset;

determine, using the provided information, an updated confidence level for the second agent; and transmit the dataset to the first agent, wherein the dataset is transmitted to the data store from a second agent different from the first agent, wherein the first agent does not communicate with the second agent.

* * * * *